US012608407B2

(12) United States Patent
Reeve et al.

(10) Patent No.: US 12,608,407 B2
(45) Date of Patent: Apr. 21, 2026

(54) SYSTEM AND METHOD FOR SEARCHING TREE BASED ORGANIZATIONAL HIERARCHIES, INCLUDING TOPIC HIERARCHIES, AND GENERATING AND PRESENTING SEARCH INTERFACES FOR SAME

(71) Applicant: CS Disco, Inc., Austin, TX (US)

(72) Inventors: Brock Joseph Reeve, Cedar Park, TX (US); Daniel Parker, Austin, TX (US); Afton Wayne McCrary, III, Pflugerville, TX (US); Matthew Jefferson Hinze, Austin, TX (US)

(73) Assignee: CS DISCO, INC., Austin, TX (US)

( * ) Notice: Subject to any disclaimer, the term of this patent is extended or adjusted under 35 U.S.C. 154(b) by 80 days.

(21) Appl. No.: 18/302,307

(22) Filed: Apr. 18, 2023

(65) Prior Publication Data

US 2024/0354318 A1 Oct. 24, 2024

(51) Int. Cl.
| | |
|---|---|
| *G06F 16/30* | (2019.01) |
| *G06F 16/31* | (2019.01) |
| *G06F 16/34* | (2019.01) |
| *G06F 16/35* | (2019.01) |

(52) U.S. Cl.
CPC ............ *G06F 16/322* (2019.01); *G06F 16/34* (2019.01); *G06F 16/35* (2019.01)

(58) Field of Classification Search
CPC ......... G06F 16/322; G06F 16/34; G06F 16/35
See application file for complete search history.

(56) References Cited

U.S. PATENT DOCUMENTS

| | | | | |
|---|---|---|---|---|
| 5,819,258 A | * | 10/1998 | Vaithyanathan | ...... G06F 16/355 |
| | | | | 707/999.005 |
| 6,772,141 B1 | * | 8/2004 | Pratt | ...................... G06F 16/334 |
| | | | | 707/999.102 |
| 11,126,647 B2 | | 9/2021 | Rollings | |
| 11,573,996 B2 | | 2/2023 | Rollings | |
| 2016/0283611 A1 | * | 9/2016 | Schiffmann | ......... G06F 16/2455 |
| 2018/0314681 A1 | * | 11/2018 | Bentley | .................. G06Q 50/08 |
| 2023/0074771 A1 | * | 3/2023 | Nefedov | ............. G06F 16/9024 |

OTHER PUBLICATIONS

Sanjeev Arora, Yingyu Liang, Tengyu Ma, A Simple but Tough-to-Beat Baseline for Sentence Embeddings, International Conference on Learning Representations, 2017, 16 pages.
Ledell Wu, Adam Fisch, Sumit Chopra, Keith Adams, Antoine Bordes Jason Weston, StarSpace: Embed All The Things, The Thirty-Second AAAI Conference on Artificial Intelligence, (arXiv:1709. 03856), 2017, 9 pages.

(Continued)

*Primary Examiner* — Belix M Ortiz Ditren
(74) *Attorney, Agent, or Firm* — Sprinkle IP Law Group

(57) ABSTRACT

Embodiments as disclosed may provide on-demand provisioning of portions of an organizational hierarchy to an interface based on the size of a viewport through which a user is interacting with the organizational hierarchy and the interactions of the user with the displayed portion of the organizational hierarchy displayed in the viewport.

21 Claims, 15 Drawing Sheets

(56) References Cited

OTHER PUBLICATIONS

Matthew E. Peters, Mark Neumann, Mohit Iyyer, Matt Gardner, Christopher Clark, Kenton Lee, and Luke Zettlemoyer, Deep Contextualized Word Representations, 2018 Conference of the North American Chapter of the Association for Computational Linguistics: Human Language Technologies, vol. 1 New Orleans, LA, 2018, pp. 2227-2237.

Jeffrey Pennington, Richard Socher, and Christopher Manning, GloVe: Global Vectors for Word Representation, 2014 Conference on Empirical Methods in Natural Language Processing (EMNLP), Doha, Qatar, 2014, pp. 1532-1543.

Tomas Mikolov, Ilya Sutskever, Kai Chen, Greg S. Corrado, Jeff Dean, Distributed Representations of Words and Phrases their Compositionality, 26th International Conference on Neural Information Processing Systems—vol. 2 (NIPS'13) (arXiv1210.4546), Curran Associates Inc., Red Hook, NY, 2014, pp. 3111-3119.

* cited by examiner

Figure 3:
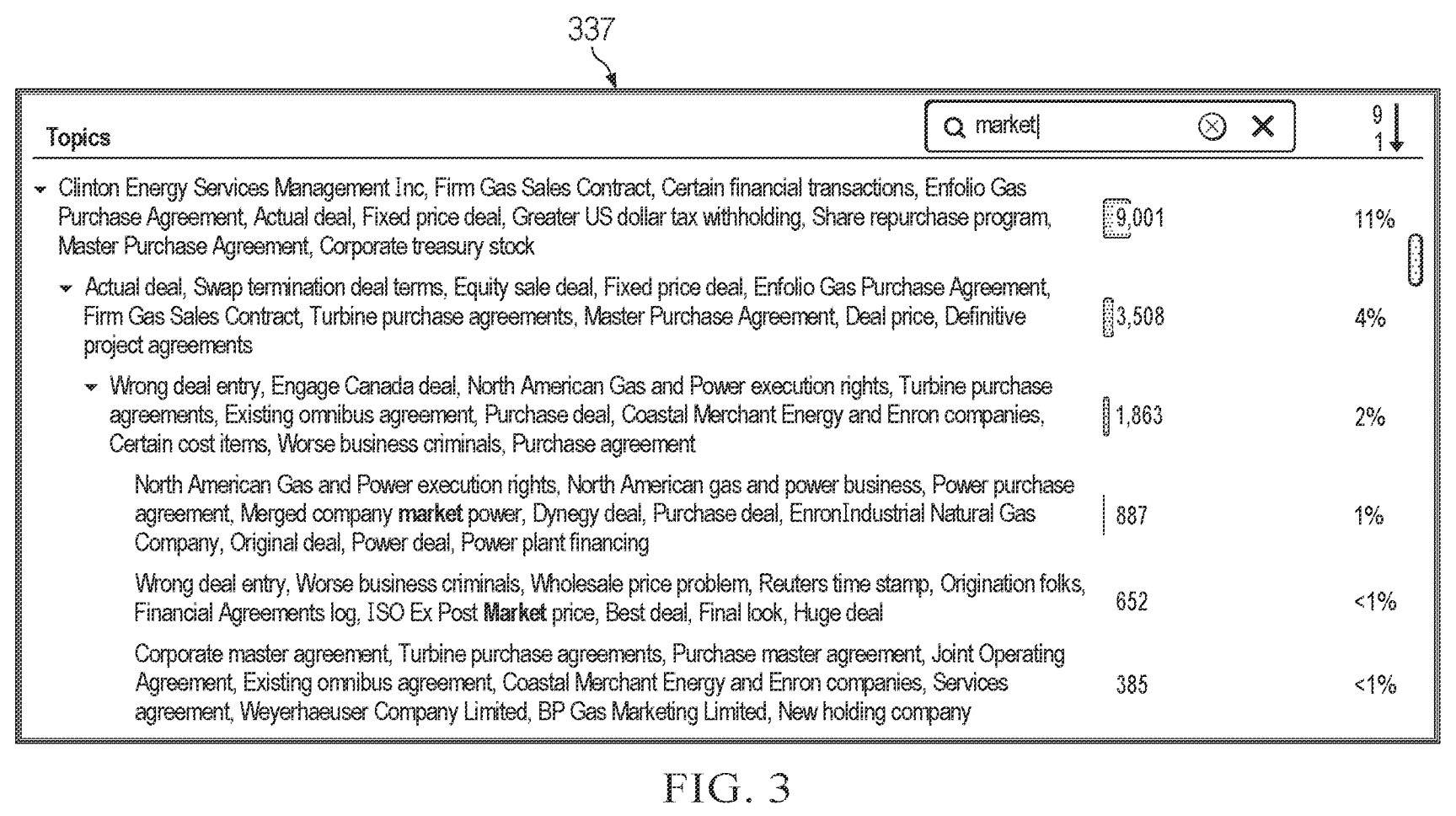

337

| Topics | | |
|---|---|---|
| Q market\| | ⊗ | ✕ |
| Clinton Energy Services Management Inc, Firm Gas Sales Contract, Certain financial transactions, Enfolio Gas Purchase Agreement, Actual deal, Fixed price deal, Greater US dollar tax withholding, Share repurchase program, Master Purchase Agreement, Corporate treasury stock | 9,001 | 11% |
| Actual deal, Swap termination deal terms, Equity sale deal, Fixed price deal, Enfolio Gas Purchase Agreement, Firm Gas Sales Contract, Turbine purchase agreements, Master Purchase Agreement, Deal price, Definitive project agreements | 3,508 | 4% |
| Wrong deal entry, Engage Canada deal, North American Gas and Power execution rights, Turbine purchase agreements, Existing omnibus agreement, Purchase deal, Coastal Merchant Energy and Enron companies, Certain cost items, Worse business criminals, Purchase agreement | 1,863 | 2% |
| North American Gas and Power execution rights, North American gas and power business, Power purchase agreement, Merged company market power, Dynegy deal, Purchase deal, EnronIndustrial Natural Gas Company, Original deal, Power deal, Power plant financing | 887 | 1% |
| Wrong deal entry, Worse business criminals, Wholesale price problem, Reuters time stamp, Origination folks, Financial Agreements log, ISO Ex Post Market price, Best deal, Final look, Huge deal | 652 | <1% |
| Corporate master agreement, Turbine purchase agreements, Purchase master agreement, Joint Operating Agreement, Existing omnibus agreement, Coastal Merchant Energy and Enron companies, Services agreement, Weyerhaeuser Company Limited, BP Gas Marketing Limited, New holding company | 385 | <1% |

LEVEL 1

514
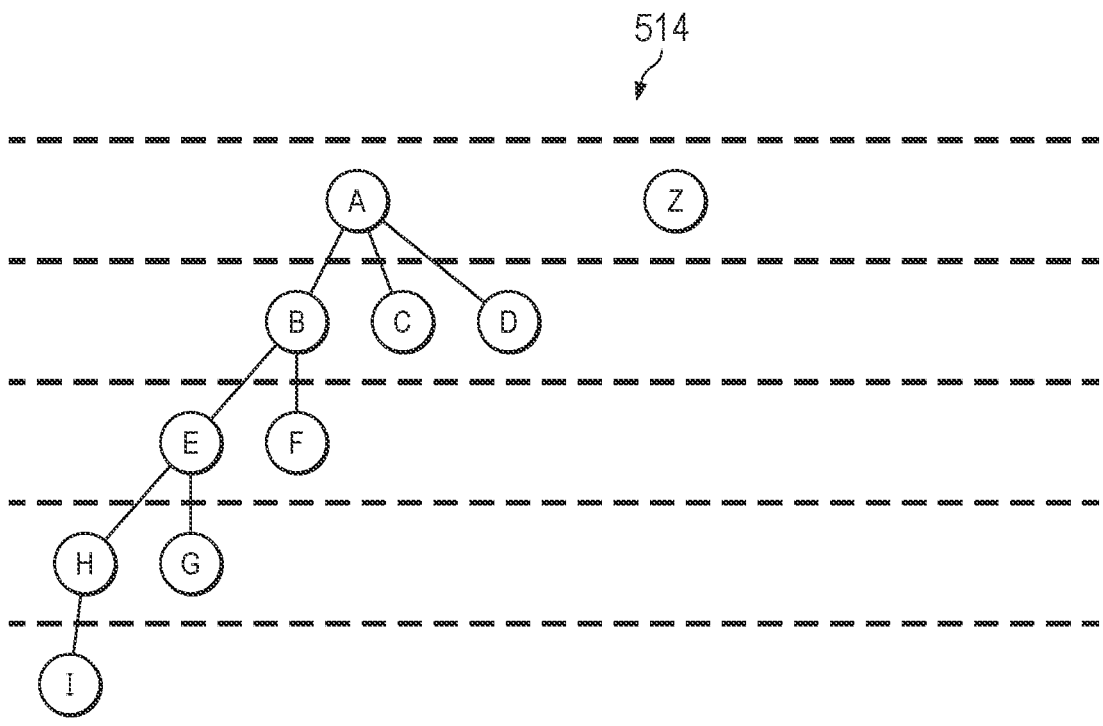
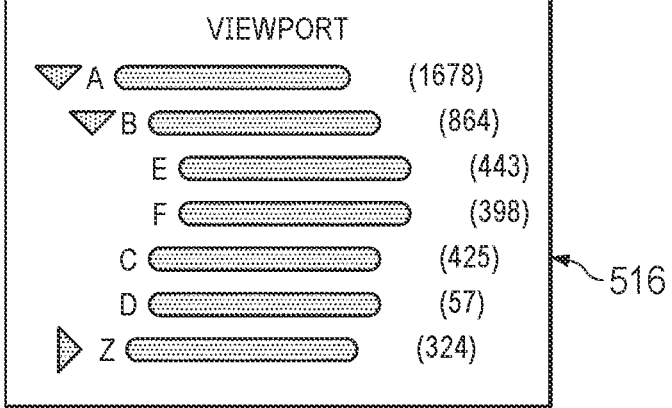
FIG. 5D

FIG. 6C

SYSTEM AND METHOD FOR SEARCHING TREE BASED ORGANIZATIONAL HIERARCHIES, INCLUDING TOPIC HIERARCHIES, AND GENERATING AND PRESENTING SEARCH INTERFACES FOR SAME

COPYRIGHT NOTICE

TECHNICAL FIELD

This disclosure relates generally to navigation of organizational hierarchies and document review systems with search functionality. In particular, this disclosure relates to the navigation and search of organizational hierarchies and the facilitation of such navigation and searching through effective and efficient generation and presentation of interfaces for navigation or searching of those organizational hierarchies. Even more specifically, this disclosure relates to the generation and presentation of interfaces for navigation and searching based on tree based topic hierarchies generated from a corpus of documents.

BACKGROUND

In the modern world, the vast majority of documents that are being created, utilized and maintained are in electronic format. A number of different situations commonly arise that require an analysis or identification of certain relevant electronic documents from a relatively large pool of available electronic documents. These situations are generally referred to as information retrieval or search problems. These types of search problems crop up in a wide variety of contexts. For example, in litigation, an entity's documents may need to be reviewed in order to identify documents that may be relevant to one or more issues in the litigation. In other examples, certain regulatory filings may require review of a number of documents to identify documents that may be relevant to one or more issues in the regulatory filing.

To illustrate in more detail, parties to litigation typically have to share relevant evidence with opposing counsel through the discovery process. In many cases, each party makes a reasonable search of their records based on some set of terms or keywords and produces the results of the search to the other party. Discovery thus typically involves the gathering of potentially relevant materials, much of it digital, and then reviewing such materials to determine what to be shared with opposite parties. Additionally, during the course of the litigation each party may continually review those documents produced by the opposing party to locate documents relevant to the case at hand. Litigation thus represents a microcosm of a more general problem raised by the high volume of electronic documents present in a variety of contexts. Namely, how can a large volume of electronic documents be understood, reviewed, or searched in order that documents relevant to a particular topic or user's interest may be located.

To aid users in resolving these problems, a document analysis system may be provided in a given electronic context. A document analysis, document review, information retrieval, or search system (which all will be utilized here substantially interchangeably) is a computer program used to process a corpus of electronically stored information (referred to as the corpus) and allow users to analyze, review or navigate the information, or search the electronic information to return responsive electronically stored information. Items of electronic information that form a corpus may be referred to interchangeably as (electronic) documents, items, files, objects, items, content, etc. and may include objects such as files of almost any type including documents for various editing applications, emails, workflows, etc. In a conventional document analysis system, a user may submit a query and the search engine selects a set of results from the corpus based on the terms of the search query. The terms of search queries usually specify words, terms, phrases, logical relationships, metadata fields to be searched, synonyms, stemming variations, etc. For example, most people are familiar with generally available Internet or web based search engines such as Google® or Microsoft®'s Bing®. Additionally, most computer applications tailored to a particular context may include their own proprietary search engines. In the context of litigation or discovery, for example, many Technology Assisted Review (TAR) applications may include their own search engine.

To aid in such searches these documents are typically organized into some sort of hierarchy. In many cases, this hierarchy may be quite large. These hierarchies can thus be utilized by users of such in the context of document review (e.g., search, navigation or other interaction) to aid in the location of desired documents or other document review tasks. The interfaces used to interact with such document analysis systems, and in particular the interfaces used to interact with the organizational hierarchy for the documents may be presented on a relatively small portion of the overall interface. Thus, a problem endemic to the use of these organizational hierarchies in document review systems is how to facilitate the efficient and rapid navigation and search of these (sometimes large) organizational hierarchies in the context of navigation or search (e.g., of the organization hierarchy or documents associated therewith) in a relatively small portion of screen real estate.

What is desired, therefore, are improved systems and methods for searching (including navigation or otherwise interacting with) these organizational hierarchies, including improved systems and methods for generating and presenting interfaces for such interactions.

SUMMARY

To continue with the above discussion, in many cases, document review systems may create organizational hierarchies to assist in navigation and search of a corpus of documents. These organizational hierarchies may be created based on the documents themselves and organized as a tree structure or the like. One example of such an organizational hierarchy is a topic organizational hierarchy (or just topic hierarchy). A topic cluster organizational hierarchy comprises a hierarchy of increasingly specific topics (e.g., which may be determined by clustering documents of a corpus) where broader topics are closer to the top (root) of the hierarchy while topics deeper in the topic hierarchy are more specific. Each of the topics of the topic hierarchy has an associated description (e.g., snippets, name, terms, tags, etc.) that may be created from, or associated with terms, phrases, segments, etc. (all used here interchangeably) of documents associated with that topic. Broad topics are inclusive of the more specific topic such that topics of the topic organizational hierarchy are organized in a tree structure where the topics of the topic hierarchy comprise the nodes of the topic hierarchy.

The use of an organizational hierarchy may thus serve to give users of a document analysis system a "table of contents" like view of a document corpus that can help users understand the document corpus. For example, the topics of such a topic cluster organizational hierarchy may be made available as search criteria in search visualization or search filters of a document review system. These topics can also be used in conjunction with any other search criteria-including date ranges, document text, and any other searchable document attribute. Searching based on a topic cluster may thus return documents that represent that topical content.

An interface of a document review system can thus present such an organizational hierarchy (or a portion thereof) in an interface such that a user can interact with the organizational hierarchy. The user can interact with the topics to, for example, expand and hide topics to explore the organizational hierarchy of the topics. The user can thus use this interface to browse broad topics or explore more specific topics to find topics of interest and to quickly find individual documents associated with those topics.

Namely, there may be a window, frame or other portion of a search or navigation interface (referred to herein as a viewport) through which a user interacts with a topic based organizational hierarchy for a corpus of documents being explored by the user. The user may thus browse and interact with the list of topics of the topic hierarchy (e.g., the descriptions, segments or terms describing each topic) through this viewport. In addition to browsing the topics of the hierarchy, a user may utilize the viewport to search the topics of the topic hierarchy. For example, a user can enter a keyword or phrase in the viewport to find all matching topics associated with the word or phrase.

In many instances, the viewport used to present and interact with this topic hierarchy may be relatively small (i.e., it may consume only a limited portion of an interface in which the viewport is included). As the topic hierarchy may be quite large (e.g., comprising perhaps hundreds or thousands of topics), it may be difficult to present topics of interest in the limited real estate of the viewport. This problem is exacerbated in the context of searching a topic hierarchy. Such a search may return a number of topics of the topic hierarchy, where those topics may each be at different locations of the organizational hierarchy. For example, these topics may be at different levels of the tree of the topic hierarchy. Thus, not only may it not be possible to present all such matching topics in the limited area of the viewport, but additionally for the topics that are presented in the viewport, there may be no context for where in the organizational hierarchy the nodes presented in the viewport are actually located. This lack of context blunts the navigational efficacy of the topic hierarchy; if a user cannot ascertain the place in the topic hierarchy where matching topics reside, the fact that those topics may match the user's search becomes less helpful. What is desired is to provide context to these matching topics of the topic hierarchy, such that the presented context in the viewport can give context to where in the topic hierarchy a matching topic in the organizational hierarchy resides.

These problems are thus a microcosm of the general problems that manifest when presenting, navigating and searching organizational hierarchies in an interface with a limited viewport. Additional problems with the presentation of organizational hierarchies may also exist. For example, as an adjunct to the problems of presentation in a limited area of an interface and the desire to present context related to organizational hierarchies, it is also the case that it may be computationally expensive (e.g., consume relatively large amounts of processor cycles or memory, etc.) to search large organizational hierarchies or associated documents. Thus, it is undesirable to perform such searches for portions of the organizational hierarchy that may not be actually displayed to a user through a viewport or with which a user is not otherwise interacting.

What is desired, therefore, are improved systems and methods for searching (including navigation or otherwise interacting with) these organizational hierarchies, including improved systems and methods for generating and presenting interfaces for such interactions.

To that end, among others, embodiments may utilize on-demand provisioning of portions of an organizational hierarchy (e.g., such as a topic hierarchy) to an interface based on the size of a viewport through which a user is interacting with the organizational hierarchy and the interactions of the user with the displayed portion of the organizational hierarchy displayed in the viewport. According to certain embodiments, the viewport at a user's device may be adapted to display each of the nodes (topics) of a topic hierarchy on approximately one line (row) of the interface. Thus, when a user initially interacts with the viewport for the topic cluster organizational hierarchy, a number of lines corresponding to the current size of the viewport (e.g., a number of nodes that may currently be displayed in the currently sized viewport) along with an interaction criteria may be determined. This interaction criteria may, for example, be a search term input by the user (e.g., using the viewport or an associated portion of a presented interface). Other interaction criteria such as dates or times or other facets of a topic or document may be imagined and are fully contemplated herein.

Based on the interaction criteria, a pruned tree (or subtree) comprising a number of matching nodes of the topic hierarchy, and their parents, can be determined based on the interaction criteria. In one embodiment, this initial subtree can be determined by searching the topic hierarchy based on the interaction criteria to obtain a pruned tree of nodes matching the interaction criteria (e.g., a user entered search term). Specifically, the topic hierarchy may be searched based on the description associated with each topic (node) of the topic hierarchy based on the associated description of that topic to determine matching nodes (topics) of the topic hierarchy and their parent nodes. Such a search can be done, for example, using a recursive query over the topic nodes of the topic hierarchy.

If this subtree includes a number of nodes less than or equal to the number of lines of the viewport (or the number of lines plus some overhead tolerance), this subtree may be returned to the interface for rendering. If, however, the number of nodes of this initial matching subtree includes more nodes than the number of lines of the viewport, the matching nodes at the highest level of the subtree (e.g., the nodes closest to the root of the topic hierarchy) can be ordered based on an ordering criteria.

This ordering criteria can be a criteria associated with each node of the subtree. Such a criteria may include, for example, a count of the documents of the document corpus associated with each of the nodes of the subtree. In one embodiment, therefore, the identifiers of each of the returned nodes (e.g., the topics or identifiers associated with those topics) may be used to search the document corpus to identify the number of documents of the document corpus associated with each of (the topics of the) nodes of the subtree (or the matching nodes of the subtree at the highest level, etc.).

The highest ordered node can then be expanded (e.g., in a depth first way) and those nodes added to the subtree until the subtree until a number of nodes equal to the number of lines of the viewport (or the number of line plus some overhead tolerance) is obtained. Expanding a node in this instance will be understood to mean a traversal of the topic hierarchy in a depth-first manner beginning with the node being expanded, where the nodes being traversed are added to the subtree.

If the subtree resulting from the expansion of the highest ordered node does not include a threshold number of nodes (e.g., the number of nodes of the subtree created from expansion of the highest ordered node is not equal to the number of lines of the viewport), the next highest ordered node at the same level of the tree (e.g., sibling nodes of the highest ordered node) may be expanded in the same manner and those nodes added to the subtree until the subtree includes a number of nodes equal to the number of lines of the viewport (or the number of line plus some overhead tolerance). The processing of these sibling nodes continues until there are no more matching sibling nodes at that level of the topic hierarchy or the desired number of nodes is reached.

If there are no more matching sibling nodes, and the desired number of nodes has not been reached in the subtree, the matching nodes at the next highest level of the topic hierarchy may be ordered based on the ordering criteria, and these matching nodes expanded as described. In this manner, the depth-first expansion of matching nodes may be undertaken in a breadth-first manner according to the ordering criteria, such that each matching sibling node at each level of the tree may be processed according to the ordering criteria beginning with the highest level of the tree until a desired number of nodes (e.g., equal to the number of lines of the viewport, or the number of line plus some overhead tolerance) are obtained in the subtree. This subtree may thus include one or more (different or unconnected) tree portions of the topic hierarchy comprising one or more matching topics (nodes) of the topic hierarchy.

Once this subtree is determined it may be provided to the interface. To provide this subtree to the interface, an adjacency list describing the subtree may be generated (e.g., as a JavaScript Object Notation (JSON) object). This adjacency list may describe the set of nodes of the subtrees, including for example the description (e.g., name) of the node, a parent identifier for each node of the subtree and the associated document count for that node. The adjacency list may also specify, for each of the described nodes, whether that node is expanded or unexpanded. In other words, for each of the nodes of the subtree the adjacency list may specify whether child nodes of that node have been included in the subtree provided to the interface.

The interface can then render all, or a subset of, the nodes of the provided subtree in the viewport of the interface. The interface can thus track what nodes of the tree portion are rendered (e.g., appear) in the viewport and where they appear (e.g., at which line of the viewport each node of the rendered tree portion appears). As the interface may be a browser based interface, this tracking may be accomplished, for example, utilizing the Document Object Model (DOM) of the interface being presented, and specifically, the portion of the DOM corresponding to the viewport. Accordingly, as the user interacts with the displayed portion of the subtree in the viewport (e.g., scrolls lower or higher in the displayed portion of the subtree, clicks to expand or hide nodes of the subtree, etc.), the interface can determine (e.g., from the DOM or from event related to the presented viewport) which of the nodes of the subtree a user is interacting with, or which nodes may be required to display in the viewport (e.g., but which are not yet displayed in the viewport). The interface can then determine from the node data associated with the subtree whether each of those nodes is expanded or unexpanded in the current tree portion stored at the interface (e.g., in the adjacency list).

For each of the nodes is unexpanded the interface may again provide a number of lines associated with the viewport of the interface displaying the topic hierarchy along with parent identifiers of each of those nodes. Based on the parent identifiers provided and the number of lines provided by the interface, a subtree comprising a number of children of those nodes equal to the number of lines (e.g., plus some overhead tolerance) can then be determined (e.g., along with their description, a parent identifier for each node of the subtree, and the associated document count for each node) and returned to the interface for display. This tracking of nodes and determination of additional subtrees can thus continue as the user interacts with the viewport of the interface.

In this manner, a match tree for a matching topic may be presented through a viewport of limited size using on-demand determination of the portion of the match tree for display in the viewport, where that on-demand determination is based on user interaction with the viewport itself. Moreover, such a topic hierarchy may be displayed in the viewport in a manner that provides context to such matching topics by not only displaying topics that match a (e.g., search) criteria, but additionally determining and presenting contextual topics for the matching topic, such as the parent topics to the matching topic that may be displayed or included in the subtree provided to the interface and displayed in the viewport.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 3 depicts an example of a viewport that may be presented in an interface.

FIGS. 5A-5D depict example trees.

FIGS. 6A-6F depict example interfaces.

DETAILED DESCRIPTION

Figure 1A:
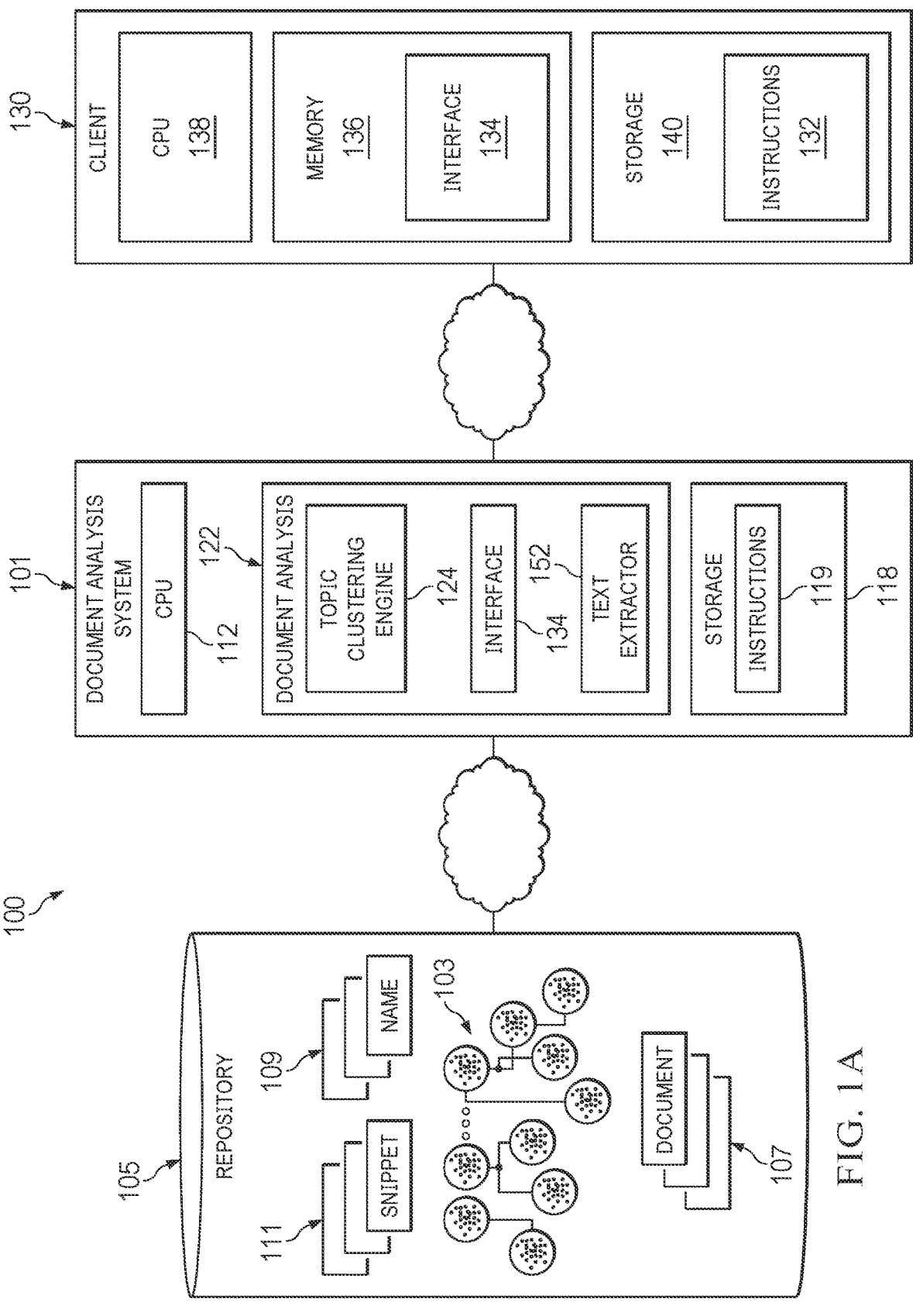
FIG. 1A is a block diagram of one embodiment of an architecture including a document analysis system.

The disclosure and various features and advantageous details thereof are explained more fully with reference to the exemplary, and therefore non-limiting, embodiments illustrated in the accompanying drawings and detailed in the following description. It should be understood, however, that the detailed description and specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before describing embodiments in more detail, it may be helpful to discuss some context around document analysis systems. A document analysis system is a computer system used to process electronically stored information (i.e., a document corpus) and navigate, search or otherwise review the electronic information (the terms navigate, search and review will be used here interchangeably). To aid in the user's review of a document corpus these document analysis systems may impose, or determine, an organizational structure for the document corpus. This organizational structure may be, for example, an index of the words or terms of the corpus or groupings of the documents of the corpus.

These organizational hierarchies may be created based on the documents themselves and organized as a tree structure or the like. One example of such an organizational hierarchy is a topic organizational hierarchy (or just topic hierarchy). A topic cluster organizational hierarchy comprises a hierarchy of increasingly specific topics (e.g., which may be determined by clustering documents of a corpus) where broader topics are closer to the top (root) of the hierarchy while topics deeper in the topic hierarchy are more specific. Each of the topics of the topic hierarchy has an associated description (e.g., snippets, name, terms, tags, etc.) that may be created from, or associated with terms, phrases, segments, etc. (all used here interchangeably) of documents associated with that topic. Broad topics are inclusive of the more specific topic such that topics of the topic organizational hierarchy are organized in a tree structure where the topics of the topic hierarchy comprise the nodes of the topic hierarchy.

Accordingly, embodiments of the systems and methods disclosed herein may generate an induced organizational hierarchy based on embeddings of portions of documents within a document corpus. These portions may include entire documents, paragraphs, sentences, phrases, words or some other syntactically or semantically defined unit. Such a unit may serve to encapsulate or serve as a proxy for individual concepts or topics. These portions can be hierarchically clustered. By clustering, it is meant herein that for a given corpus, portions (or documents) determined from the corpus will be separated into one or more possibly overlapping groups, called clusters. The term hierarchical indicates that, for certain embodiments, these clusters will be organized into a graph or tree of defined topics such that if a portion (or document) is a member of a cluster (topic) that has a parent in the tree, then the parent cluster also includes the portion (or document). A cluster (topic) within the hierarchy is considered a leaf cluster if it is a leaf in the organizational structure and is considered a parent cluster if the cluster is not a leaf cluster.

The hierarchical clusters of the portions of documents and the associated documents can be utilized to aid in the navigation, analysis, search or other type of review of the documents of the corpus. To further increase the usefulness of such clusters in review of the documents of the corpus, one or more representative snippets or names may be determined for each cluster. A snippet may be a portion of the document (e.g., which may be the same as, or different, than the portions of the cluster) having a rank with respect to that cluster (or the portions comprising the cluster) above some snippet threshold, while a name may be a ranked word, term, phrase or token included in a portion or snippet associated with the cluster. The snippets and names for the hierarchical clusters may be presented by the document analysis system to a user as the user reviews the hierarchical clusters and documents of the corpus using a document analysis system to support the human readability and understanding of the clusters by the users.

Thus, embodiments of systems that utilize the organizational hierarchies disclosed herein may provide relatively more information regarding the topics (e.g., each cluster) and associated documents while grouping documents in a more intuitive way that can have the benefit of revealing the key elements of the corpus in certain circumstances. Accordingly, embodiments allow users to quickly drill-down to relevant and meaningful content or documents within a corpus within a short period of time by leveraging the associated hierarchical clusters and meaningful labels.

The use of an organizational hierarchy may thus serve to give users of a document analysis system a "table of contents" like view of a document corpus that can help users understand the document corpus. For example, the topics of such a topic cluster organizational hierarchy may be made available as search criteria in search visualization or search filters of a document review system. These topics can also be used in conjunction with any other search criteria-including date ranges, document text, and any other searchable document attribute. Searching based on a topic cluster may thus return documents that represent that topical content. Such topic cluster organizational hierarchies are also described in U.S. Pat. No. 11,126,647 (filed Dec. 13, 2019) and U.S. Pat. No. 11,573,996 (filed Aug. 23, 2021), to Rollings et al., both of which are fully incorporated herein by reference in their entirety for all purposes. It will be understood that while topic cluster organizational hierarchies as discussed are one example of an organizational hierarchy, and it is with respect to such an example that embodiments depicted herein have been described, other embodiments may be effectively utilized with other types of organizational hierarchies and all such embodiments are fully contemplated herein without loss of generality.

Looking now at FIG. 1A, a block diagram of one embodiment of a document analysis system employing hierarchical clustering of document portions to determine a topic organizational hierarchy is depicted. The document analysis system 101 is part of computing environment 100 including a repository 105, document analysis system 101, and one or more client computers 130. Repository 105 may comprise a file server or database system or other storage mechanism remotely or locally accessible by document analysis system 101 which, according to an embodiment, may be almost any SQL or NoSQL platform such as MongoDB, Elasticsearch or the like. Repository 105 may store documents 107 that document analysis system 101 may allow users accessing the document analysis system 101 to review (e.g., navigate, search, tag, etc.).

In the depicted embodiment, document analysis system 101 may include one or more (virtual or physical) servers or other type of computing device utilizing a central processing unit 112 connected to a memory and a data store 118 (e.g., via a bus). Central processing unit 112 may represent a single processor, multiple processors, a processor(s) with multiple processing cores and the like. Data store 118 may include a volatile or non-volatile non-transitory storage medium such as RAM, hard disk drives, flash memory devices, optical media or the like. Document analysis system 101 may be connected to a data communications network such as the Internet, a local area network (LAN), a wide area network (WAN), a cellular network or some other network or combination of networks.

Data store 118 stores computer executable instructions 119. Computer executable instructions 119 can represent one or more multiple programs or operating system instructions. In one embodiment, instructions 119 are executable to provide document analysis application 122. Document analysis application 122 may be implemented on the same computing systems or can be distributed across multiple computing systems, platforms, or physical or virtual servers. Again, it will be noted here that while embodiments described and depicted with respect to FIG. 1A includes a deployment of a document analysis system on a physical computing device, other embodiments may include the document analysis system deployed as a service on, for example, a cloud computing environment or otherwise deployed without loss of generality.

Client computer system 130 may include components similar to those of the server of document analysis system 101, such as CPU 138 and data store 140. Additionally, client computer system 130 may include executable instructions 132 to provide user interface 134 that allows a user to interact with document analysis system 101 to review the documents 107 of the corpus. These instructions 132 may have, for example, been provided by document analysis system 101 in response to an access by client computer 130. For example, user interface 134 may be provided through a web browser, file system interface or other method without loss of generality. Moreover, user interface 134 may interact (e.g., issue requests, receive responses, etc.) with a corresponding interface 136 of the document analysis application 122, which may be, for example, a web services interface, an Application Programming Interface (API) or another type of interface.

Again, those skilled in the art will appreciate that document analysis system 101 shown in FIG. 1A is merely an example of a computing system and embodiments of a document analysis system that may be implemented using other computing systems (e.g., desktop computers, laptops, mobile computing devices, services platforms, cloud computing platforms or other computing devices or platforms with adequate processing and memory) including multiple computers acting together to provide a document analysis system (e.g., a cluster of servers or other computing devices connected by a network acting together to provide the document analysis system). Similarly, client computer 130 may include any suitable desktop computer, laptop, mobile device, server or other computing system.

As discussed, in order to provide a user reviewing the document 107 of the corpus (e.g., through interface 134) topic clustering engine 124 may generate an organizational hierarchy of clusters 103 based on portions of the documents 107 within the corpus. Each of those clusters may represent a topic. Additionally, topic clustering engine 124 may generate one or more representative snippets 111 and names 109 for clusters of the organizational hierarchy of topic cluster 103. The hierarchical topic cluster 103 of the portions of documents 107 along with the snippets 111 and names 109 can be presented to the user through the interface 134 by the document analysis system 101 to aid the user in the navigation, analysis, search, or other type of review of the document 107 of the corpus to support the human readability and understanding of the topics 103 and document 107 by the users.

Figure 1B:
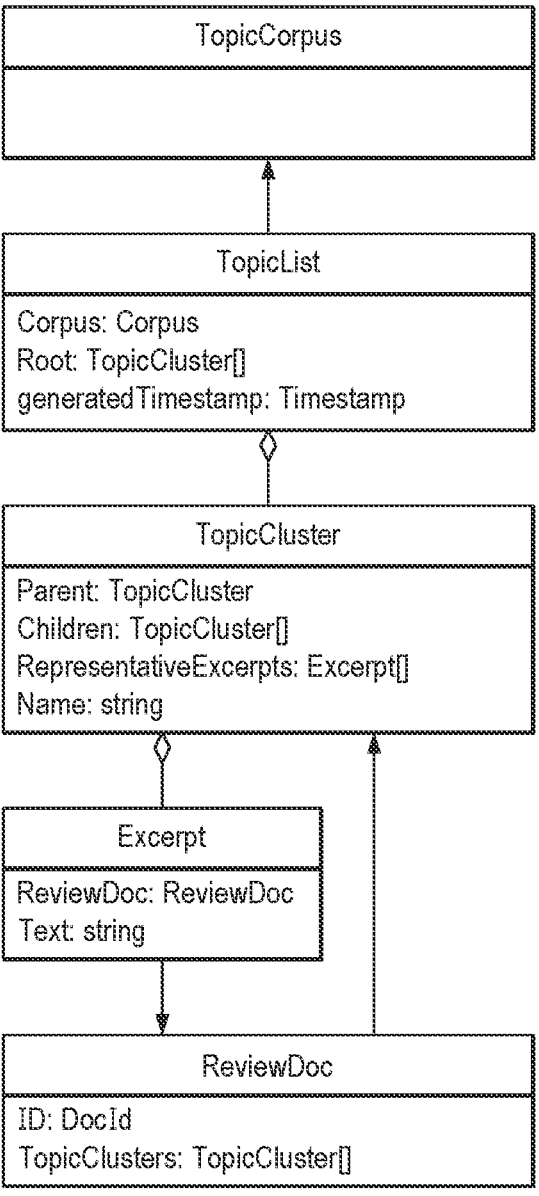
FIG. 1B is a block diagram of one embodiment of a model that may be used by a document analysis system for a topic hierarchy.

One embodiment of a model that may be used by a document analysis system for such a topic hierarchy and associated documents is depicted in FIG. 1B. A TopicCorpus is a set of documents. A database of documents provided for a review is an example of a TopicCorpus. A TopicCorpus could also be a set of document identifiers, or the results of a user search within a Review Database. A TopicCluster can be associated with a TopicCorpus. A TopicList is the domain type that represents topic clusters (topics) that have been identified in a corpus of documents. A TopicCluster represents one topic cluster (topic) and its relationship to other clusters (topics) in the list. Along with its position in the topic hierarchy, a topic cluster (topic) may have a unique identifier and a system-generated, user-friendly Name. An Excerpt is a representative text snippet for the topic (TopicCluster). A TopicCluster may maintain a series of these (snippets) from select documents associated with the topic that may indicate to the user why the document was included in the topic (cluster). The Excerpt is associated with the document (ReviewDoc) that contains that Excerpt.

Returning to FIG. 1A, to illustrate in more detail, in some embodiments, when a document 107 is added to the document analysis system 101, or when documents 107 are processed in a batch format (e.g., at a particular time interval), a document 107 can be provided to text extractor 152 that parses or analyzes the document 107 to determine the text for the document 107. The text can then be stored in association with the document 107 or portion or provided to the topic clustering engine 124. The text extractor 152 may also perform document cleaning of the documents 107, whereby a type of document 107 may be determined and certain data may be stripped or separated from the document 107. For example, if a document 107 is an email or the like, the header information may be stripped from the document 107.

At some point, topic clustering engine 124 will determine that a clustering run should take place. This determination may be made based on the expiration of a certain amount of time (e.g., a clustering interval), the ingest or addition of a threshold number of (e.g., new) documents 107 to the repository or another criteria. It should be noted here that while embodiments may be described as clustering the entirety of the corpus of documents 107 during each clustering run, embodiments may also be effectively utilized to cluster portions or groups of a document corpus (e.g., a group of newer or older documents may be clustered separately, documents from different departments of a corporation may be clustered separately, etc.). Moreover, embodiments may also cluster individual or a set of documents (e.g., newly added or ingested documents) between clustering runs based on an existing hierarchy of topics 103, as will be discussed in more detail at a later point.

When a clustering run occurs, the extant corpus of documents 107 (e.g., the text of the documents 107) will be provided to the topic clustering engine 124. The topic clustering engine 124 will separate each of the documents 107 (e.g., the text of non-empty documents) into a set of portions. These portions may include entire documents, paragraphs, sentences, phrases, words or some other syntactically or semantically defined unit. In one embodiment, for example, sentences may be utilized as the portions, such that each document may be separated into sentences, using, for example, a set of sentence delimiters such that each document may be split into portions by separating the text of the document on the characters of the sentence delimiters. The set of sentence delimiters may, for example, be language specific (e.g., there may be a first set of sentence delimiters for English, a second set for French, a third set for Japanese, etc.). In these types of embodiments, once the language of a document or portion of a document is identified, the sentence delimiters associated with the identified language may be utilized to separate that document (or portion of document) into corresponding sentences. Alternatively, a master set of sentence delimiters may be utilized for all documents in all languages, or other configurations may be utilized.

The portions extracted from each document may then be stored in the repository in association with the document 107 from which they were extracted. Other data associated with the portion or document may also be stored in the repository, including, for example, a portion's position (e.g., in characters) within the document 107 from which it was extracted, an index indicating the portion's order in the document with respect to the other portions of that document or a language identified for the portion (the portion language). Thus, each (e.g., non-empty) document 107 is associated with a set of ordered portions extracted from that document 107 (e.g., where the ordered portions recapitulate or with the inclusion of the appropriate separators, could be used to reconstitute, the document 107).

Once the portions of the document 107 in the corpus are extracted, the topic clustering engine 124 may determine the tokens of the portions and cluster these portions to determine hierarchical clusters of portions 103 where each cluster represents a topic. In one embodiment, the topic clustering engine 124 may implement a filter to separate portions to cluster (referred to as clusterable portions) from portions which are to be excluded from the clustering (referred to as an unclusterable portion). This filter may utilize almost any criteria or combination of criteria desired, including for example, number of characters or tokens in a portion, the types of characters or tokens in a portion, an amount of known characters or tokens in a portion, the presence of patterns or regular expressions in a portion, or other criteria.

The topic clustering engine 124 can then embed the portions of the documents (e.g., those identified as clusterable or all the portions) to generate a portion embedding vector for each portion. Embedding is a method of converting sets of discrete objects into points within a space and serves to quantify or categorize semantic similarities between linguistic items based on their distributional properties in large samples of language data. Accordingly, the portion embedding vector generated for a portion may represent the semantics of that portion regardless of the language or syntax utilized in the portion. The portion embedding vector generated for a portion may be stored in repository 105 in association with that portion. For example, the document analysis system 101 may include or reference a repository of cross-lingual word embedding vectors such as the FastText embeddings provided by Project Muse (Multilingual Unsupervised and Supervised Embeddings). Other types of embeddings may also be utilized without loss of generality, including for example Word2Vec, GloVE, BERT, ELMO or the like). In this manner, regardless of the language of the portion, that portion can be converted to a common representation of the semantics of the topics or concepts of that portion.

The topic clustering engine 124 can thus map each portion (or the tokens thereof) to the list of word embedding vectors to produce the portion embedding vector for the portion. The word embedding vector may be of a dimension (e.g., number of integers) that may be user configured or empirically determined. This mapping may be done, for example, by mapping each token (or each of a determined subset of the tokens) of the portion to a vector in the word embedding vectors to determine a vector for each token of the portion and utilizing that vector to generate the portion embedding vector according to the order the tokens occur in the portion. In one specific embodiment, the topic clustering engine 124 can utilize SIF to generate a portion embedding vector by generating a pre-embedding vector for the portion and adjusting the pre-embedding portion for the vector using an embedding adjustment vector determined for the corpus of documents 107. Examples of SIF used in sentence embeddings are presented in A Simple but Tough-to-Beat Baseline for Sentence Embeddings, by Sanjeev Arora, Yingyu Liang, Tengyu Ma, presented in the International Conference on Learning Representations (ICLR), 2017, incorporated herein fully by reference for all purposes. As discussed, other types of embeddings may also be used in particular embodiments. Examples of such embeddings include StarSpace: Embed All The Things by Ledell Wu et al (2017 arXiv: 1709.03856 [cs.CL]); Deep Contextualized Word Representations by Matthew E. Peters et al (2018 arXiv: 1802.05365 [cs.CL]; GLOVE: Global Vectors for Word Representation by Jeffrey Pennington et al (2014) and Distributed Representations of Words and Phrases their Compositionality by Tomas Mikolov (2013 arXiv1210.4546 [cs.CL]) all of which are incorporated herein fully by reference for all purposes.

The topic clustering engine 124 can then perform hierarchical clustering on the (e.g., clusterable) portions (referred to as a clustering universe) based on the portion embedding vector associated with each portion to determine hierarchical topic clusters 103. This clustering may be accomplished utilizing almost any hierarchical clustering tools or methodology desired, including, for example, recursive application of k-means clustering (e.g., as implemented in scikit), agglomerative clustering, or convex clustering.

In one embodiment for example, recursive k-means clustering may be utilized by first determining a set of initial clusters by applying k-means clustering to the clustering universe (e.g., initially the portion embedding vectors for all the portions) to generate a set of (e.g., non-overlapping) clusters of the portions. When determining the clusters, the topic clustering engine 124 may assign each portion to a cluster based on the distance between the portion embedding vector of the portion and the centroid of each determined cluster. For example, the topic clustering engine 124 may assign a portion to exactly one cluster, namely, the cluster with the centroid closest to the portion embedding vector corresponding to the portion. Additionally, the topic clustering engine 124 may be configured with a minimum or maximum cluster number such that the number of initial clusters produced is at least the minimum number, and at most the maximum number, of clusters.

For each of the determined initial clusters, the topic clustering engine 124 determines a cluster centroid (also known as just the centroid) which is a vector whose number of dimensions is equal to the number of dimensions in the portion embedding vectors of the portions being clustered. The topic clustering engine 124 can also determine the number of documents for which at least one constituent portion is contained in the cluster; this is the number of constituent documents of that cluster. Each of the initial clusters is then stored in the repository 105 (e.g., as part of the hierarchy of clusters 103), where each cluster is associated with the cluster centroid for the cluster, the portions assigned to that cluster, and the number of constituent documents of that cluster.

To generate any remaining clusters of the hierarchy 103, the topic clustering engine 124 may then recursively apply k-means clustering to each of the previously determined clusters (e.g., initially the first recursive application of clustering is applied to the determined initial clusters, the second recursive application of clustering is applied to the clusters determined from the first recursive application of clustering, etc. until a termination criteria is reached).

In one embodiment, for example, during each application of clustering, each of the set of clusters generated in a previous application of clustering may be evaluated to determine if that cluster has a number of constituent documents exceeding a minimum parent document count and if a traversal path from a root node or cluster of the organizational hierarchy 103 to that cluster is not greater (e.g., or equal) to a maximum depth. If these conditions are met that cluster may be deemed a parent cluster. Alternatively, if the cluster has a number of constituent documents less than (e.g., or equal) to the minimum parent document count or if a traversal path from a root node or cluster of the organizational hierarchy 103 to that cluster is greater (e.g., or equal) to a maximum depth, that cluster may be deemed a leaf cluster.

For each of the determined parent clusters, clustering can then be applied to that parent cluster by utilizing the portion embedding vectors for the portions assigned to that parent cluster as the clustering universe and applying k-means clustering to that clustering universe to generate a set of (e.g., non-overlapping) clusters of the portions of that parent cluster. Each cluster resulting from the clustering of a parent cluster (referred to as potential child clusters) is associated with its cluster centroid and the number of documents for which at least one constituent portion is contained in the cluster (the number of constituent documents of that cluster). Each potential child cluster can then be evaluated to determine if it should be stored as part of the organizational hierarchy 103.

Specifically, in one embodiment it can be determined if the number of constituent documents 107 of the potential child cluster is greater than some minimum leaf document count. In one embodiment, only if all of the potential child clusters have a number of constituent documents 107 greater than the minimum leaf document count will the set of potential child clusters be deemed accepted clusters and stored as a child of the parent cluster (e.g., from which it was derived) in the hierarchy of clusters 103 and associated with the cluster centroid for the cluster, the portions assigned to that cluster, and the number of constituent documents of that cluster. Alternatively, each potential child cluster for which the number of constituent documents 107 is greater than the minimum leaf document count will be deemed an accepted cluster and stored as a child of the parent cluster (e.g., from which it was derived) in the hierarchy of clusters 103 and associated with the cluster centroid for the cluster, the portions assigned to that cluster, and the number of constituent documents of that cluster. The recursive clustering can then be applied to each of these accepted clusters and the recursive clustering continued until there are no clusters in the hierarchy 103 that have a number of constituent documents exceeding a minimum parent document count and a traversal path from a root node or cluster of the organizational hierarchy 103 to that cluster greater (e.g., or equal) to a maximum depth.

Moreover, each of the documents 107 is assigned to one or more topics of the organizational hierarchy (e.g., to cluster the documents 107). In one embodiment, a document 107 may be associated with a topic of the organizational hierarchy 103 if at least one (clusterable) portion of that document is associated with that topic cluster. It will be realized then that a single document 107 may be associated with none of the clusters of the organizational hierarchy 103 (e.g., if the document included no clusterable portions), a single cluster of the organizational hierarchy 103 or multiple clusters of the organizational hierarchy 103. It will be noted that this document assignment may occur as the clustering of the portions to determine the hierarchical organization 103 is occurring or as a separate standalone process.

After the topic clustering engine 124 performs a clustering run then hierarchical clusters of portions 103 are stored in the repository 105, where the clusters including one or more overlapping groups of portions are organized into a graph (e.g., a tree) such that if a portion is a member of a cluster that has a parent in the graph, then the parent cluster also includes the portion. Each of the topics in the hierarchical topic clusters 103 is associated with the cluster centroid for the cluster, the portions assigned to that cluster, and the number of constituent documents of that cluster.

Once the organizational hierarchy 103 is determined, the topic clustering engine 124 can generate representative snippets 111 and names 109 for those clusters (e.g., to support the human readability and understanding of the clusters by the users). Snippets 111 associated with a cluster may be ranked portions assigned to that cluster of a sufficiently high ranking. To determine snippets for a cluster then, in certain embodiments the portions assigned to the cluster (or a subset thereof) may be ranked and ordered according to rank such that a top number of portions may be utilized as snippets for that cluster. There may be a different number of these snippets utilized in different contexts. There may, for example, be a reporting snippet number describing a number of snippets to report for a cluster when a user accesses or interact with the organizational hierarchy 103 (e.g., which may default to all assigned portions), or a storing snippet number describing a number of snippets to store for a cluster in the organizational hierarchy 103 (e.g., which may default to all assigned portions).

These snippets 111 may be determined differently for different types of clusters within the organizational hierarchy 103. For example, to determine snippets 111 for a leaf cluster of the organizational hierarchy 103 the topic clustering engine 124 may rank order all portions assigned to the leaf cluster according to the Euclidean distance of the portion embedding vector of that portion to the centroid of that cluster, with portions having smaller distances ranked higher than those having larger distances. The rankings of each portion of the leaf cluster may be stored in association with that leaf cluster and portion. The topic clustering engine 124 can then associate or identify the top-ranked portions for the cluster to that cluster in the organizational hierarchy 103 as that cluster's snippets 111 (e.g., or a number of the top-ranked portions up to the reporting snippet number or storing snippet number). In one embodiment, when determining these snippets 111 any portions having a language other than a default language for the corpus of documents 107 or topic clustering engine 124 (e.g., English) may be ignored.

To determine the snippets 111 for parent clusters in the organizational hierarchy 103, in one embodiment, the topic clustering engine 124 aggregates all snippets 111 from the children clusters of that parent cluster and rank orders these snippets 111 according to the Euclidean distance of the portion embedding vector for each snippet (portion) to the centroid of the parent cluster (again with portions having smaller distances to the centroid of the parent cluster ranked higher than those having larger distances). Other embodiments may use other (or additional) metrics to rank order the snippets 111, such as cosine similarity of the portion embedding vector for each snippet to the parent cluster. The topic clustering engine 124 can then associate the snippets 111 of the child clusters to the parent cluster in a round-robin fashion by selecting the top-ranked (with respect to the parent cluster's centroid) snippet 111 of each child cluster as the first set of snippets for the parent cluster, and then taking the next highest ranked snippet of each child cluster as the second set of snippets for the parent cluster, and associating these in the same way, until all such snippets of all child clusters are exhausted or until a number of snippets to store for the cluster is fulfilled. The topic clustering engine 124 can then associate or identify the selected portions for the cluster to that cluster in the organizational hierarchy 103 as that cluster's snippets 111 (e.g., ranked in the method just described).

To generate names 109 for a cluster of the organizational hierarchy 103 the topic clustering engine 124 may extract terms from the portions associated with that cluster and associate these extracted terms with the cluster as names 109 of the cluster. The portions from which these terms are extracted may be subset of the portions associated with the cluster, such as the snippets 111 associated with that cluster. In particular, according to certain embodiments, the extracted terms may be scored and ranked such that a top number of the terms may be utilized as names 109 for that cluster. The topic clustering engine 124 may thus be configured with a reporting name number describing a number of names to report for a cluster when a user accesses or interacts with the organizational hierarchy, or a storing name number describing a number of names to store for a cluster in the organizational hierarchy 103.

In one specific embodiment, the terms extracted to determine the names 109 for a cluster may be based on one or more linguistic categories. Thus, in certain embodiments, the topic clustering engine 124 includes a configurable list of linguistic categories to be extracted from portions associated with a cluster, including for example nouns, verbs, or noun phrases. Accordingly, after the organizational hierarchy 103 is determined, the topic clustering engine 124 can extract each of the configured linguistic categories from one or more portions associated with each cluster. For example, the topic clustering engine 124 may extract all terms identified as the configured linguistic categories from among the snippets associated with that cluster. This extraction may be performed using, for example, a natural language processing (NLP) tool or library such as SpaCy or the like.

For each extracted term of a linguistic type, the topic clustering engine 124 may generate an embedding vector.

The generation of an embedding vector may use the same, or different, processes or methods for generating the portion embedding vectors for the portions of the documents as described above. In one embodiment, for terms that are a single word, a term embedding vector may be determined from the repository of word embeddings used to generate portion embedding vectors, while for terms that are multi-word phrases, the term embedding vector for the term may be an average of each component of the word embedding vectors for the constituent words of the phrase. The topic clustering engine 124 can then rank the extracted terms based on a score for each term determined between a snippet centroid for the cluster (e.g., the cluster for which the names are being determined) and the term embedding vector of that term. This score may be a similarity measure such as a cosine similarity or the like. A snippet centroid for a cluster can be determined by a term ranker based on a raw portion embedding vector associated with each of the snippets of the cluster. This raw portion embedding vector for a snippet may be stored in association with the snippet during the determination of the portion embedding vector for the snippet or, alternatively, may be determined for the snippet from a list of word embedding vectors such that each component of the raw embedding vector is equal to the unweighted average of the corresponding components in the list of the word embedding vectors for the snippet. Based on the score for each term, the terms can be ranked and a top-ranked number of terms (e.g., of each linguistic category) may be selected and stored as the names 109 for the cluster (e.g., with a number of names stored not to exceed the storing name number).

The topic clustering engine 124 may also apply one or more filters to the set of extracted terms. These filters may filter the set of extracted terms according to almost any criteria desired. As an example of such filters, for each linguistic category, the topic clustering engine 124 may filter the ranked list of terms to remove variant spellings, grammatical forms, or terms that vary only in punctuation, keeping only the top-ranked spelling, grammatical form, or punctuation variety. As another example of a filter, for each linguistic category, the topic clustering engine 124 may remove any term in the extracted terms that has a punctuation character or any term that is included, or whose lemma is included, in a (e.g., configurable) blacklist of terms not to be included. Such lemmas can be produced, for example, by using an NLP tool such as SpaCy.

In one specific embodiment, before the terms are ranked and selected as names the topic clustering engine 124 may apply a balance factor to the similarity score for each term to weight the similarity score for the term. In one instance, a balance factor can be determined for each linguistic category and applied to the terms associated with that linguistic category. As another example, a specific balance factor may be determined for each cluster and for each linguistic category based on the depth or height of the cluster within the organizational hierarchy 103. When determining names 109 for a particular cluster, the balance factor associated with both that cluster and the linguistic category of the term may be applied to the score for that term to weight the score according to the applicable balance factor. Based on the (adjusted) score for each term, the terms can be ranked and a top-ranked number of terms (e.g., of each linguistic category) may be selected and stored as the names 109 for the cluster.

As noted above, the documents 107 of the corpus are associated with the clusters of the organizational hierarchy 103, thus as a user navigates the organization hierarchy 103 (e.g., using interface 134), the user may be presented with the ability to view or access documents associated with each topic of the organizational hierarchy 103. The snippets 111 or names 109 can also be presented to the user through the interface 134 by the document analysis system 101 in association with the hierarchical topic clusters 103 to aid the user in the navigation, analysis, search or other type of review of the document 107 of the corpus by increasing the human readability and understanding of the clusters 103 and documents 107 by the users.

As a user navigates the organizational hierarchy 103 or reviews the documents 107 of the corpus (e.g., using interface 134), the user may be presented with the ability to view or access documents 107 associated with each cluster of the organizational hierarchy 103 and to perform analysis of such documents 107. The snippets 111 or names 109 can also be presented to the user through the interface 134 by the document analysis system 101 in association with the hierarchical clusters 103 along with the rank or order of clusters of the organizational hierarchy 103 with respect to each document and the rank or order of documents 107 associated with the clusters of the organizational hierarchy 103. Such information aids the user in the navigation, analysis, search or other type of review of the documents 107 of the corpus.

More generally, the organizational hierarchy 103 can be used by document analysis systems and their users for a variety of ends. For example, in some embodiments, each (or multiple) clusters of the organizational hierarchy 103 may be used to filter a list of documents (e.g., or portions, snippets, etc.), including for example the results of a search query, to produce a filtered list of documents containing exactly those documents that are both contained within the initial list and assigned to the cluster.

Figure 2A:
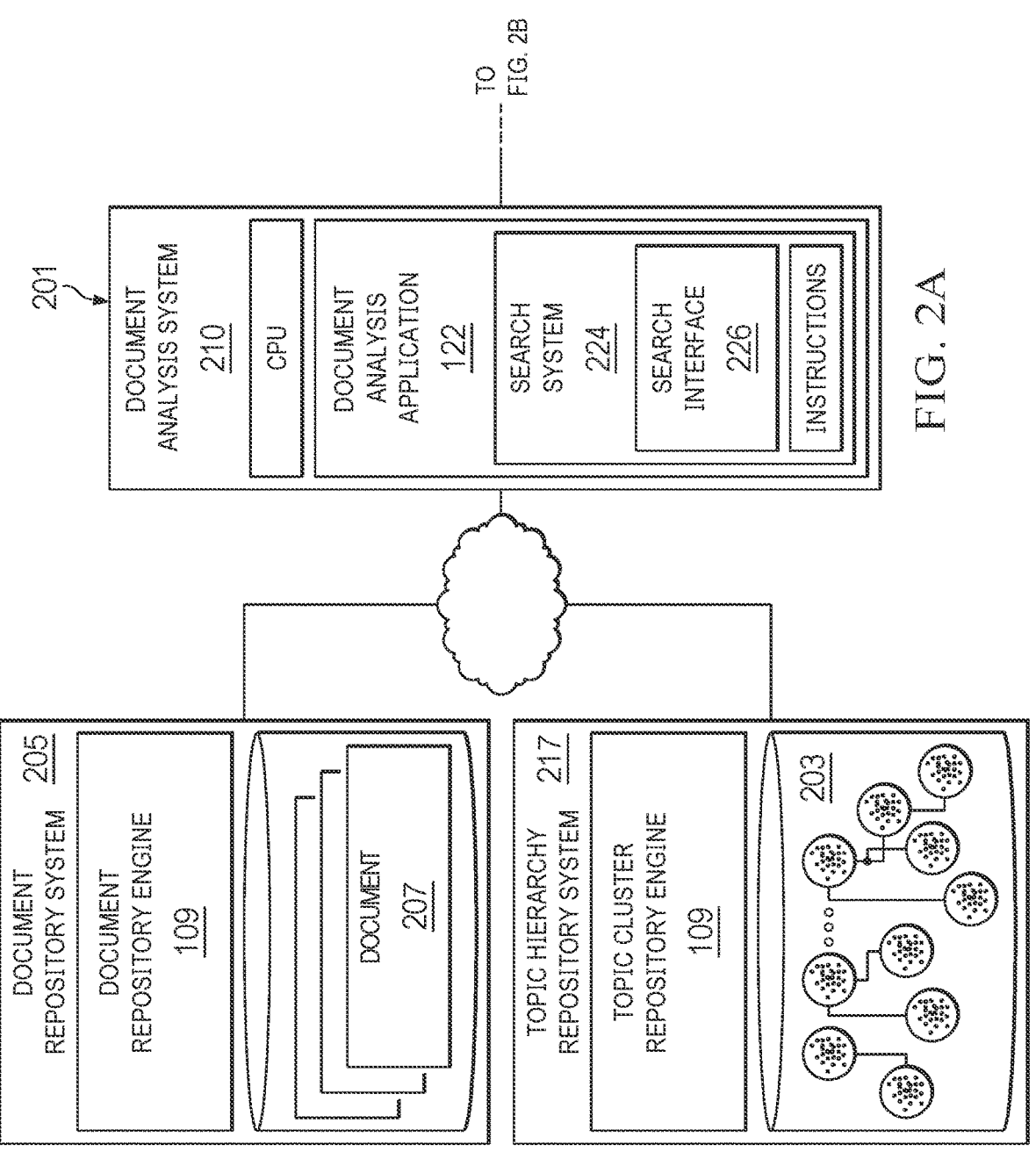
FIGS. 2A-2B are a block diagram of one embodiment of a document analysis system including an interface for interacting with a topic hierarchy.
Figure 2B:
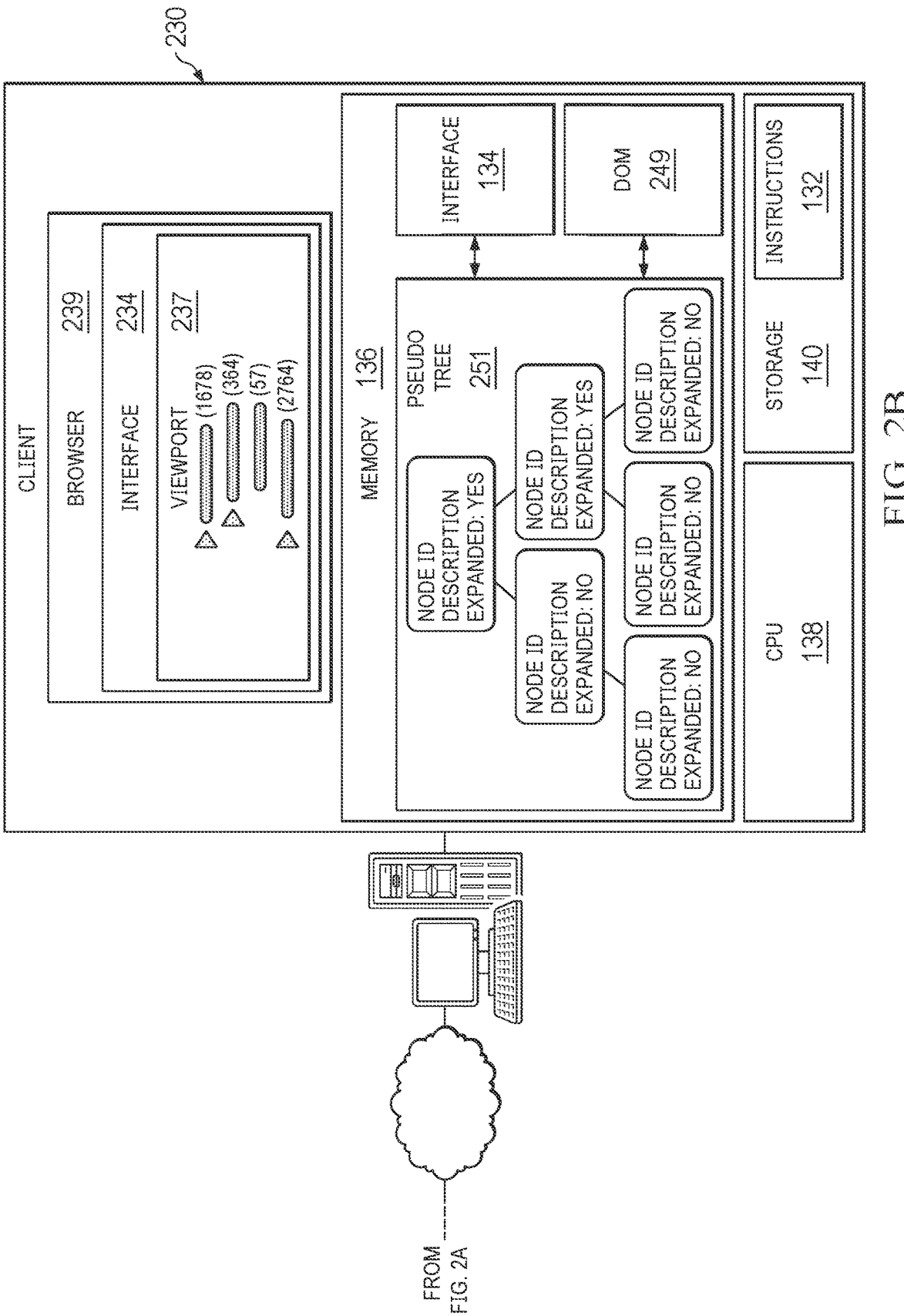

Moving then to FIGS. 2A-2B, a block diagram of one embodiment of a document analysis system including an interface for interacting with a topic organizational hierarchy is depicted. As discussed, the document analysis system 201 may determine a topic hierarchy 203 (e.g., a topic cluster organizational hierarchy) from a corpus of documents 207. In some embodiments, the topic hierarchy 203 and documents 207 may be stored in distinct repositories 205, 217.

When a user at a user device 230 accesses the document analysis system 201, the document analysis system 201 may provide interface 234. This interface may comprise a set of instructions that may be stored in a memory 236 at the user device 230 and may execute on the user device 120. Such an interface 234 may be a standalone application or a browser based application (e.g., some combination of JavaScript, HTML or another executable or markup language, or combination of languages) such that when a user at the user device 230 access the document analysis system 201 using a browser 239 the instructions for the interface 234 may be provided by document analysis system 201 and stored at the user device 230. When the instructions for the interface 234 are executed, they are adapted to present the interface 234 in the browser 239.

The interface 234 of document analysis system 201 can thus present such an organizational hierarchy (or a portion thereof) in the interface 234 such that a user can interact with the topic hierarchy 203. The user can interact with the topics of the topic hierarchy 203 to, for example, expand and hide topics to explore the topics of the topic hierarchy 203 or the hierarchical relationships of such topics. The user can thus use this interface 234 to browse broad topics or explore more specific topics to find topics of interest and to quickly find individual documents associated with those topics.

Namely, there may be a window, frame or other portion of a search or navigation interface (referred to as a viewport 237) through which a user interacts with the topic hierarchy 203 for the corpus of document 207 being explored by the user. The user may thus browse and interact with the list of topics of the topic hierarchy 203 (e.g., the descriptions (names or snippets) describing each topic) through this viewport 237. The user can, for example, expand topics to access subtopics of that topic or hide subtopics of a particular topic or scroll in the interface to access other topics of the topic hierarchy 203 that are not visible in the viewport 237. In addition to browsing the topics of the topic hierarchy 203, a user may utilize the viewport 237 to search the topics of the topic hierarchy. For example, a user can enter a keyword or phrase in the viewport 237 to find all matching topics associated with the word or phrase.

As the user interacts with the viewport 237 and other portions of the interface 234 to navigate the topic hierarchy 203 and the documents 207, the interface 234 (e.g., the set of instructions providing the interface 234) interact with the navigation system 224 of the document analysis system 210. Specifically, the interface 234 may send requests to navigation system 224 and receive responses from this navigation system 224. Based on the responses, the appropriate interface 234 can be rendered in the browser 239. In particular, navigation system 224 may provide a search interface 226. As a user submits searches through the viewport 237, the interface 234 may send requests associated with such searches to the search interface 236. Based on the response received from the search interface 226, the interface 234 at the user device 230 may render, update or perform other actions with respect to the topic hierarchy presented in viewport 237.

An example of a viewport that may be presented in an interface is depicted in FIG. 3. Notice that in the depicted example the user has used the viewport 337 to search the term "market" and responsive nodes in the topic hierarchy are presented in the viewport 337. Specifically, notice that responsive nodes whose description includes the term "market" are presented along with their respective parent nodes of the topic hierarchy, even in cases where the parent nodes are not directly responsive to the search term "market".

Referring back now to FIGS. 2A-2B, in many instances, the viewport 237 used to present and interact with this topic hierarchy 203 may be relatively small (i.e., it may consume only a limited portion of an interface 234 in which the viewport 237 is included). As the topic hierarchy 203 may be quite large (e.g., comprising perhaps hundreds or thousands of topics), it may be difficult to present topics of interest in the limited real estate of the viewport 237. This problem is exacerbated in the context of search of a topic hierarchy 203. Such a search may return a number of topics of the topic hierarchy 203, where those topics may each be at different locations of the organizational hierarchy 203. For example, these topics may be at different levels of the tree of the topic hierarchy 203. Thus, not only may it not be possible to present all such matching topics in the limited area of the viewport 237, but additionally for the topics that are presented in the viewport 237, there may be no context for where in the organizational hierarchy 203 the nodes presented in the viewport 237 are actually located. This lack of context blunts the navigational efficacy of the topic hierarchy; if a user cannot ascertain the place in the topic hierarchy 203 where matching topics reside, the fact that those topics may match the user's search becomes less helpful. What is desired is to provide context to these matching topics of the topic hierarchy 203 in the viewport

237, such that the presented context in the viewport 237 can give context to where in the topic hierarchy a matching topic in the organizational hierarchy resides.

Additionally, as the topic cluster 203 and associated documents 207 may reside in different repositories (that may be accessed at different systems 205, 217, etc., it is also the case that it may be computationally expensive (e.g., consume relatively large amounts of processor cycles or memory, etc.) to search these topic clusters 203 or associated documents 207. It is thus additionally desired to minimize the searching of documents 207 or the topic hierarchy 203.

Embodiments may thus utilize on-demand provisioning of portions of topic hierarchy 203 to interface 234 based on the size of viewport 237 through which a user is interacting with the topic hierarchy 203 and the interactions of the user with the displayed portion of the topic hierarchy displayed in the viewport 237. According to certain embodiments, the viewport 237 at a user's device may be adapted to display each of the nodes (topics) of topic hierarchy 203 on approximately one line (row) of the viewport 237. Thus, when a user initially interacts with the viewport 237 for the topic hierarchy 203, a number of lines corresponding to the current size of the viewport 237 (e.g., a number of nodes that may currently be displayed in the currently sized viewport) along with an interaction criteria may be determined. The number of lines of viewport 237 may be determined, for example from DOM 249 associated with the rendered interface 234 (e.g., the portion of the DOM 249 corresponding to viewport 237). This interaction criteria may, for example, be a search term input by the user (e.g., using the viewport 237 or an associated portion of a presented interface).

Based on the interaction criteria, the interface 234 can then send a request to the search interface 226 for a subtree. Specifically, the search interface 226 may provide an application programming interface (API) or the like through which a subtree associated with topic hierarchy 203 may be requested. Such an API may, for example, be adapted to receive requests including identifiers for (e.g., parent) nodes (e.g., topics) of the topic hierarchy 203 and specifying a number of lines. Thus, initially, interface 234 may send a request to search interface 226 with an empty list of parent nodes (e.g., nothing has yet been rendered in the viewport 237), along with a number of lines corresponding to a number of lines associated with the size of the rendered viewport 237.

Based on the interaction criteria, search interface 226 may determine a pruned tree (or subtree) comprising a number of matching nodes of the topic hierarchy 203, and their parents, based on the interaction criteria. The number of nodes of the subtree can be determined based on the number of lines requested, and may be equal to the number of lines requested (or the number of lines plus some overhead tolerance). In one embodiment, this initial subtree can be determined by searching the topic hierarchy 203 based on the interaction criteria received in the request to obtain a pruned tree of nodes matching the interaction criteria (e.g., a user entered search term). Such a search may be accomplished by performing the search of topic hierarchy 203 at topic hierarchy repository system 205. Specifically, the topic hierarchy 203 may be searched based on the description associated with each topic (node) of the topic hierarchy 203 to determine matching nodes (topics) of the topic hierarchy 203 and their parent nodes in the topic hierarchy 203. Such a search can be done, for example, using a recursive query over the topic nodes of the topic hierarchy.

For example, the children at any level of a document hierarchy 203 can be obtained by executing a query similar to the recursive query below for a given interaction criteria (e.g., topic text or description) and parent identifier (which may be the root of the topic hierarchy in the case of a request not specifying any parent node).

```
with RECURSIVE findTree AS(
SELECT
    id,
    parentId
    FROM topic
    WHERE topicListId = 2 and descriptionSearch @@
    (phraseto_tsquery('simple',search_term)::text || ':*')::tsquery
    UNION
        SELECT c.id,
            c.parentId
        FROM topic c, findTree t
        WHERE c.id = t.parentId
)
    select t.id, t.topicID, t.description, t.descriptionSearch @@
    (phraseto_tsquery('simple',search_term)::text || ':*')::tsquery as match
    from findTree f
        join topic t on t.id = f.id
        where f.ParentID = parent
```

If the subtree determined from the topic hierarchy 203 includes a number of nodes less than or equal to the requested number of lines of the viewport 237 (or the number of lines plus some overhead tolerance), this subtree 251 may be returned to the interface 234 at the user device 230 for rendering in the interface 234. If, however, the number of nodes of this initial matching subtree includes more nodes than the requested number of lines of the viewport 237, the matching nodes at the highest level of the returned subtree (e.g., sibling nodes closest to the root of the topic hierarchy) can be ordered based on an ordering criteria.

This ordering criteria can be a criteria associated with each node of the determined subtree. Such an ordering criteria may include, for example, a count of the documents 207 of the document corpus associated with each of the nodes of the subtree. In one embodiment, therefore, search interface 226 may utilize the identifiers of each of the returned nodes of the subtree (e.g., the topics or identifiers associated with those topics) to search the corpus of documents 207 at document repository system 217 to identify the number of documents 207 of the document corpus associated with each of (the topics of the) nodes of the subtree (or the matching nodes of the subtree at the highest level, etc.). The nodes of the subtree can then be ordered based on the ordering criteria. Here, for example, the nodes the highest level of the subtree can be ordered based on the number of documents 207 associated with each of those nodes (e.g., the node with the greatest number of documents may be the highest ordered node of the sibling nodes, etc.).

The topic hierarchy 203 can then be expanded (e.g., the topic hierarchy traversed in a depth first manner beginning with the node being expanded), where the nodes being traversed are added to the subtree, in a depth first manner from this highest ordered node (e.g., the node with the most documents 207 associated with it) and the nodes of the topic hierarchy discovered during this traversal added to the subtree until the subtree includes a number of nodes equal to the number of lines of the viewport (or the number of line plus some overhead tolerance). The descendants of a node in the topic hierarchy 203 can be determined be executing a query similar to the query below:

```
with RECURSIVE findTree AS(
SELECT
  id,
  parentId
FROM topic
WHERE topicListId = active_topic_list.id and descriptionSearch @@
(phraseto_tsquery('simple', search_term)::text || ':*')::tsquery
UNION
SELECT
  c.id,
  c.parentId
FROM topic c, findTree t
WHERE c.id = t.parentId
)
select t.topicId
from findTree f
  join topic t on t.id = f.id
  where t.parentChainSearch @@ to_tsquery('simple',
correctParentId::VARCHAR);
```

If the subtree resulting from the expansion of the highest ordered node (of the sibling nodes at the highest level of the tree) does not include a threshold number of nodes (e.g., the number of nodes of the subtree created from expansion of the highest ordered node is not equal to the number of lines of the viewport 237), the next highest ordered node at the same level of the tree (e.g., sibling nodes of the highest ordered node) may be expanded in the same manner and those nodes added to the subtree until the subtree includes a number of nodes equal to the number of lines of the viewport 237 (or the number of line plus some overhead tolerance). The processing of these sibling nodes continues until there are no more matching sibling nodes at that level of the topic hierarchy, or the desired number of nodes for the subtree is reached.

If there are no more matching sibling nodes at a level of the topic hierarchy 203, and the desired number of nodes has not been reached in the subtree, the matching nodes (e.g., matching the interaction criteria received from the interface 234 at the user device 230) at the next highest level of the topic hierarchy may be ordered based on the ordering criteria, and these matching nodes expanded in turn starting with the highest ordered node at that level of the topic hierarchy 203 until a desired number of nodes of the subtree is reached (as described above). In this manner, the depth-first expansion of matching nodes of the topic hierarchy 203 may be undertaken and added to a subtree in a breadth-first manner according to both the ordering criteria and the interaction criteria, such that each matching sibling node (e.g., matching the interaction criteria received at the search interface 226) at each level of the tree of the topic hierarchy 203 may be processed according to the ordering criteria (e.g., the highest number of associated documents 207) beginning with the highest level of the tree of the topic hierarchy 203 until a desired number of nodes (e.g., equal to the number of lines of the viewport 237, or the number of line plus some overhead tolerance) are obtained in a subtree. This subtree may thus include one or more (different or unconnected) tree portions of the topic hierarchy 203 comprising one or more topics (nodes) of the topic hierarchy 203 that match the interaction criteria provided from the interface 234 in the request.

Once this subtree of the topic hierarchy 203 is determined by the search interface 226 it may be provided to the interface 234 at the user device 230. To provide this subtree to the interface, an adjacency list describing the subtree may be generated (e.g., as a JavaScript Object Notation (JSON) object). This adjacency list may describe the set of nodes of the subtree, including for example the description (e.g., name) of the node, a parent identifier for each node of the subtree and the associated document count for that node. The adjacency list may also specify, for each of the described nodes, whether that node is expanded or unexpanded. In other words, for each of the nodes of the subtree the adjacency list may specify whether child nodes of that node have been included in the subtree provided to the interface.

When this subtree 251 is received by the interface 234 at the user device 230 the subtree 251 is stored at the user device 230 and the interface 237 can then render all, or a subset of, the nodes of the provided subtree 251 in the viewport 237 of the interface 234. When the interface renders these nodes of the subtree 251 in the view ports 237 of the interface 234 these nodes may also be added to the DOM associated with the interface 234. The interface 234 can thus track what nodes of the subtree 251 are rendered (e.g., appear) in the viewport 251 and where they appear (e.g., at which line of the viewport 237 each rendered node of the subtree 251 appears).

Again, as the interface 234 may be a browser based interface, this tracking may be accomplished utilizing the DOM 249 of the interface 234 being presented, and specifically, the portion of the DOM 249 corresponding to the viewport 237. Accordingly, as the user interacts with the displayed portion of the subtree 251 in the viewport 237 (e.g., scrolls lower or higher in the displayed portion of the subtree, clicks to expand or hide nodes of the subtree, etc.), the interface 234 can determine which of the nodes of the subtree 251 a user is interacting with, or which nodes may be required to display in the viewport 237 (e.g., but which are not yet displayed in the viewport). The interface 234 can then determine from the node data associated with the subtree 251 at the user device 230 whether each of those nodes is expanded or unexpanded in the current tree portion stored at the interface (e.g., in the adjacency list).

For each of the unexpanded nodes that the interface 234 determines as may be required to display or expand in the viewport 237, the interface 234 can send a request to the search interface 226 along with a number of lines associated with the viewport 237 of the interface 234 displaying the topic hierarchy along with parent identifiers of each of those unexpanded nodes.

When the search interface 226 receives such a request from the interface 234 with these provided parent identifiers and the number of lines (e.g., of the viewport 237), the search interface 226 can once again determine a subtree to send back to the interface 234. Once again, the determined subtree may comprise a number of children of those identified parent nodes equal to the number of lines (along with their description, a parent identifier for each node of the subtree, and the associated document count for each node). The search interface 226 can then return this newly determined subtree to the interface 234 for display in the viewport 237 as needed. This tracking of displayed expanded and unexpanded nodes of the topic hierarchy 203 in the viewport 237, and the determination of additional subtrees 251 can thus continue as the user interacts with the viewport 237 of the interface 234 at the user device 230.

In this manner, a subtree for topics of a topic hierarchy 203 matching a search may be presented through a viewport 237 of limited size using on-demand determination of the subtree for display in the viewport 237, where that on-demand determination is based on user interaction with the viewport itself. Moreover, (portions of) such a topic hierarchy 203 may be displayed in the viewport 237 in a manner that provides context to matching topics by not only displaying topics that match a (e.g., search) criteria, but additionally determining and presenting contextual topics for the matching topic, such as the parent topics to the matching topic for display or inclusion in the subtree provided to the interface 234 and displayed in the viewport 237.

Figure 4:
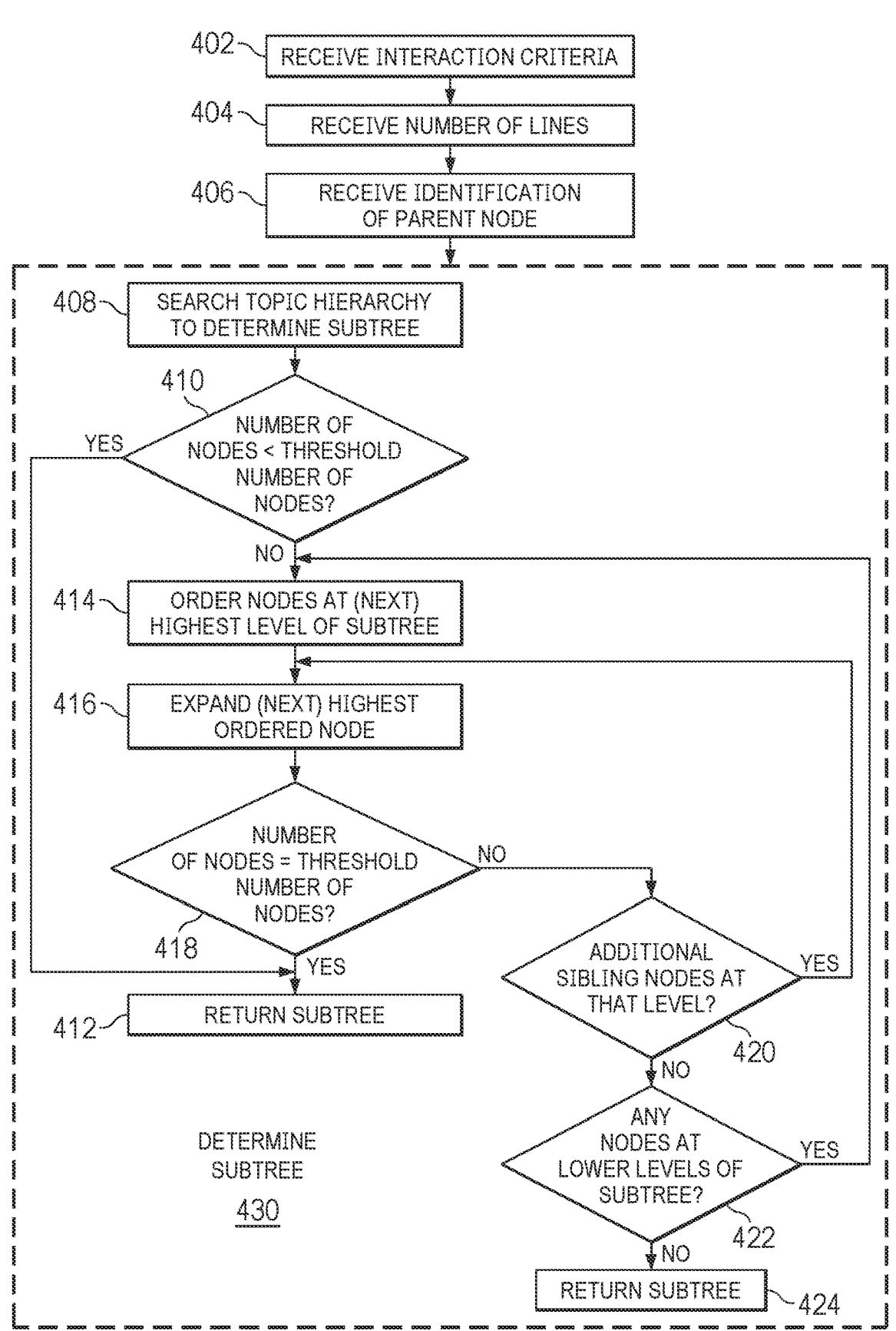
FIG. 4 is a flow diagram depicting one embodiment of a method for determining a subtree of a topic hierarchy.

Looking now at FIG. 4, one embodiment of a method for determining a subtree of a topic organizational hierarchy that may be utilized in presenting an interface for interacting with such a topic hierarchy is depicted. Initially, an interaction criteria such as a search term or query may be received (STEP 402). Additionally, a number of lines associated with a size of a rendered (e.g., presented) viewport for the topic hierarchy may also be determined (STEP 404). An identifier of any parent nodes of the topic hierarchy may be received (STEP 406). In the case of determining an initial subtree for an interface, such a list of parent nodes may be empty.

Based on these criteria, a pruned tree (or subtree) comprising a number of matching nodes of the topic hierarchy, and their parents, may be determined (STEP 430). The number of nodes of the subtree can be determined based on the number of lines requested and may be equal to a threshold number of lines requested (e.g., the number of lines requested or the number of lines plus some overhead tolerance).

In one embodiment, this subtree can be determined by searching the topic hierarchy based on the interaction criteria received in the request to obtain a pruned tree of nodes matching the interaction criteria (e.g., a user entered search term) (STEP 408). Specifically, the topic hierarchy may be searched based on the description associated with each topic (node) of the topic hierarchy to determine matching nodes (topics) of the topic hierarchy and their parent nodes in the topic hierarchy. Such a search can be done, for example, using a recursive query over the topic nodes of the topic hierarchy.

If the subtree determined from the topic hierarchy includes a number of nodes less than or equal to the threshold number of lines this subtree may be returned for rendering in the interface (Y Branch of STEP 410 and STEP 412). If, however, the number of nodes of this initial matching subtree includes more nodes than the requested number of lines of the viewport (N Branch of STEP 410), the matching nodes at the highest level of the returned subtree (e.g., sibling nodes closest to the root of the topic hierarchy) can be ordered based on an ordering criteria (STEP 414).

This ordering criteria can be a criteria associated with each node of the determined subtree. Such an ordering criteria may include, for example, a count of the documents of the document corpus associated with each of the nodes of the subtree. In one embodiment, therefore, search interface may utilize the identifiers of each of the returned nodes of the subtree (e.g., the topics or identifiers associated with those topics) to search the corpus of documents at document repository system to identify the number of documents of the document corpus associated with each of (the topics of the) nodes of the subtree (or the matching nodes of the subtree at the highest level, etc.). The nodes of the subtree can then be ordered based on the ordering criteria.

The topic hierarchy can then be expanded in a depth first manner from this highest ordered node (e.g., the node with the most documents associated with it) and the nodes of the topic hierarchy discovered during this expansion added to the subtree (STEP 416) until the subtree includes a number of nodes equal to the threshold number of lines of the viewport (Y Branch of STEP 418) at which point the subtree may be returned for rendering in the interface (STEP 412).

If the subtree resulting from the expansion of the highest ordered node (of the sibling nodes at the current highest level of the tree) does not include a threshold number of nodes (N Branch of STEP 418), and if there are more matching sibling nodes at that level of the topic hierarchy (Y Branch of STEP 420), the next highest ordered node at the same level of the tree (e.g., sibling nodes of the previously highest ordered node) may be expanded in the same manner and those nodes added to the subtree (STEP 416) until the subtree includes a number of nodes equal to the number of lines of the viewport (Y Branch of STEP 418). That subtree may then be returned for rendering in the interface (STEP 412). If the subtree resulting from the expansion of the next highest ordered node does not include a threshold number of nodes (N Branch of STEP 418), the processing of these sibling nodes continues until there are no more matching sibling nodes at that level of the topic hierarchy (N Branch of STEP 420), or the desired number of nodes for the subtree is reached (Y Branch of STEP 418).

If there are no more matching sibling nodes at a level of the topic hierarchy (N Branch of STEP 420), and the desired number of nodes has not been reached in the subtree, if there are any nodes at lower levels of the subtree (Y Branch of STEP 422) the matching nodes at the next highest level of the topic hierarchy may be ordered based on the ordering criteria (STEP 414), and these matching nodes expanded in turn starting with the highest ordered node at that level of the topic hierarchy until a desired number of nodes of the subtree is reached (as described above with respect to STEPS 416, 418 and 420). If there are no nodes at a lower level of the subtree (N Branch of STEP 422), the subtree may be returned for rendering in the interface (STEP 424).

It may now be helpful to an understanding of embodiments to go over certain examples. Recall that according to some embodiments what is desired is to show an expanded view of any match trees. Namely, if a child node of a topic hierarchy matches an interaction criteria such as a search it is desired to render the hierarchy from the top of the tree (or a portion thereof) to the matching node. Thus, the parent nodes of a matching topic node may be shown in a viewport even if those parent nodes do not themselves match the search. Moreover, since a topic hierarchy or even a portion of a topic hierarchy tree may be extremely large, embodiments may only display a portion of a topic hierarchy that is visible in the viewport. As the user scrolls the other children of the tree are determined dynamically on-demand. The nodes at each level of the topic hierarchy may be ordered by an ordering criteria such as document counts.

Figure 5A:
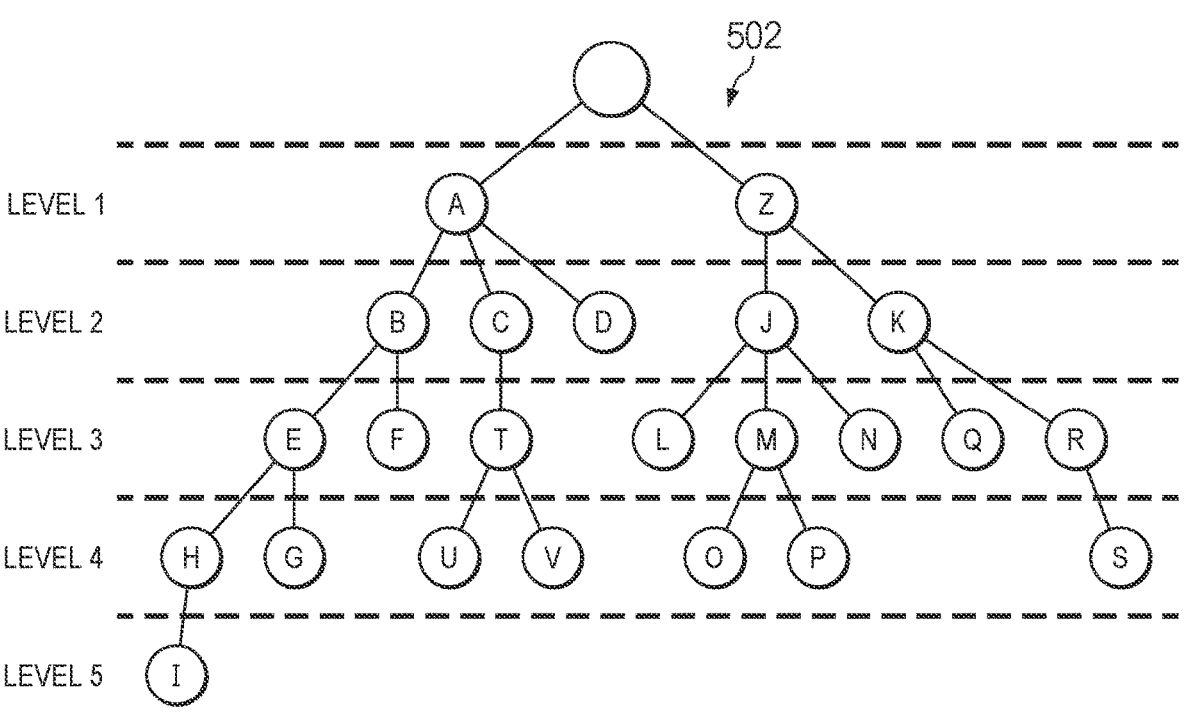
Figures 5B, 5C:
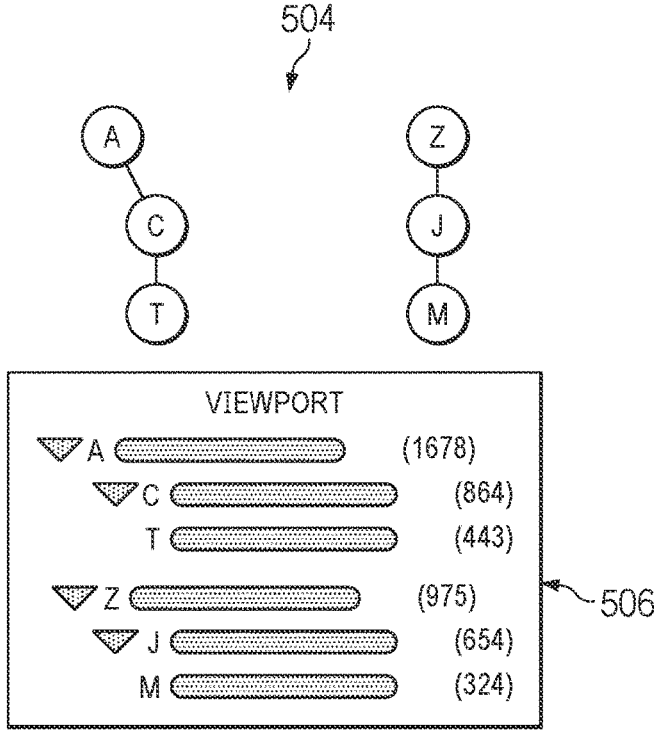

With that in mind, attention is directed to FIG. 5A which depicts a tree 502 for an example topic hierarchy comprising topics "A". "B", "C", "D", "E", "F", "G", "H", "I". "T", "U". "V" and "Z", hierarchically arranged as shown. FIG. 5B depicts the subtree 504 that would be determined from tree 502 in the case where nodes T and M match a search criteria, along with an example viewport 506 that would be rendered based on such a subtree 504. Notice here that the subtree may include two distinct tree portions of topic hierarchy tree 502.

Now suppose that tree 502 represents a matching subtree where both nodes at the highest level (level 1) of the tree 502 (nodes "A" and "Z") match an interaction criteria. Moreover, assume for purposes of this example that 7 lines (e.g., nodes) have been requested and that the threshold for a number of nodes to return in a subtree is ten nodes. FIG. 5C depicts the initial matching subtree 512 for a subtree determination based on tree 502, where this subtree 512 includes matching nodes "A" and "Z". Now, assume further that nodes "A" and "Z" are ordered based on a document count and node "A" has a greater number of associated documents and is thus ordered higher than node "Z". Since node "A" is ordered higher, node "A" is expanded first in a depth-first way until the threshold number of ten nodes is achieved in the subtree.

FIG. 5D depicts the subtree 514 determined from tree 502 based on the initial determination of matching nodes "A" and "Z" with "A" being the highest ordered node at that level and the subsequent depth first traversal of the topic hierarchy tree 502 until the threshold number of nodes is reached. Notice that while the threshold number of ten nodes may be included in the subtree each node up to 7 nodes is fully expanded in a depth-first manner. Nodes "F", "C", "D" and "Z" are not expanded but are ordered by their respective document counts. Viewport 516 depicts an example viewport 506 that would be rendered based on such a subtree 514. As the user interacts with the viewport 516 the interface may request 7 more nodes where that request may include parent identifiers for nodes "F", "C", "D" or "Z" such the viewport 516 may be updated with appropriate portions of the topic hierarchy based on the user's interaction with the interface.

Figure 6A:
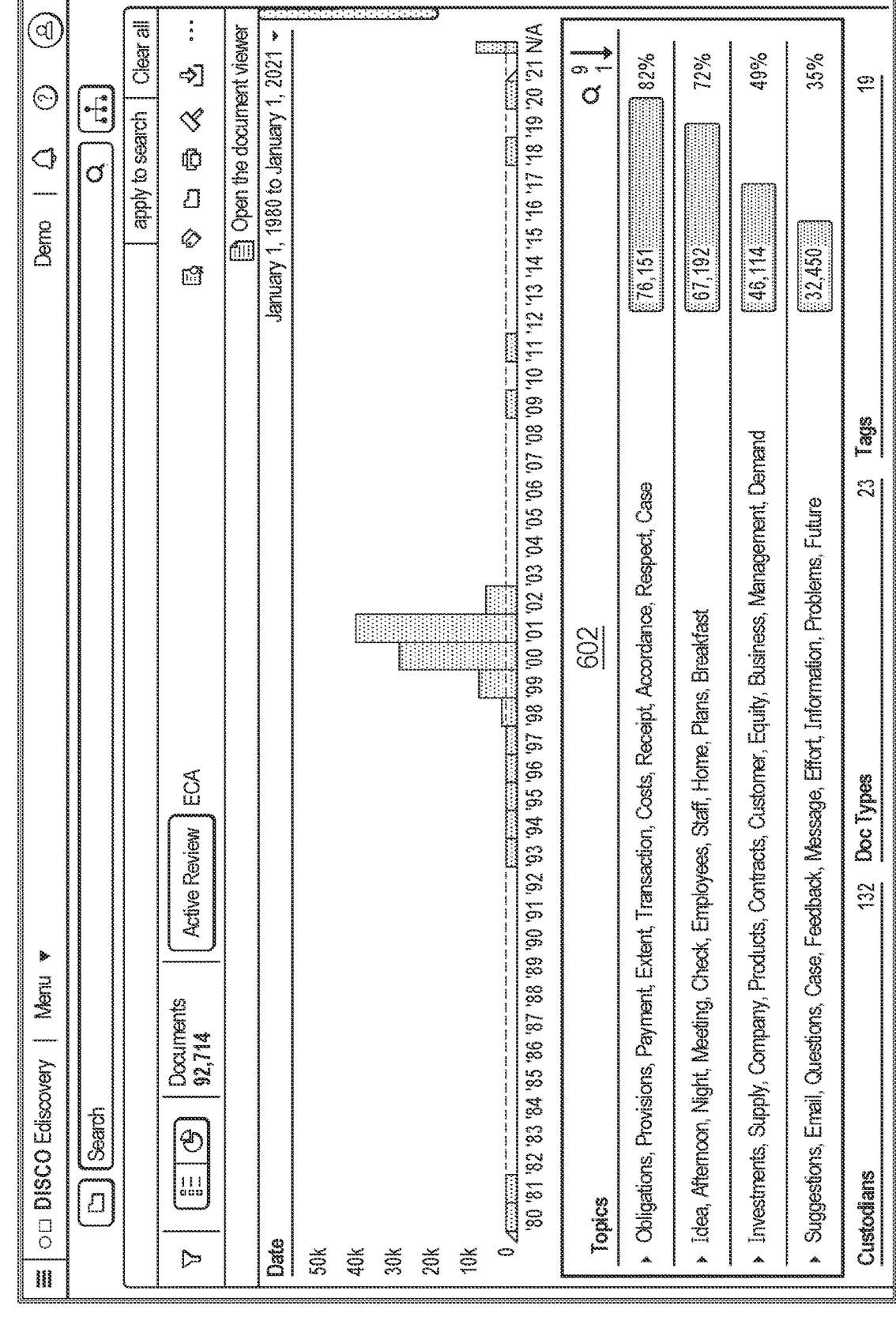
Figure 6B:
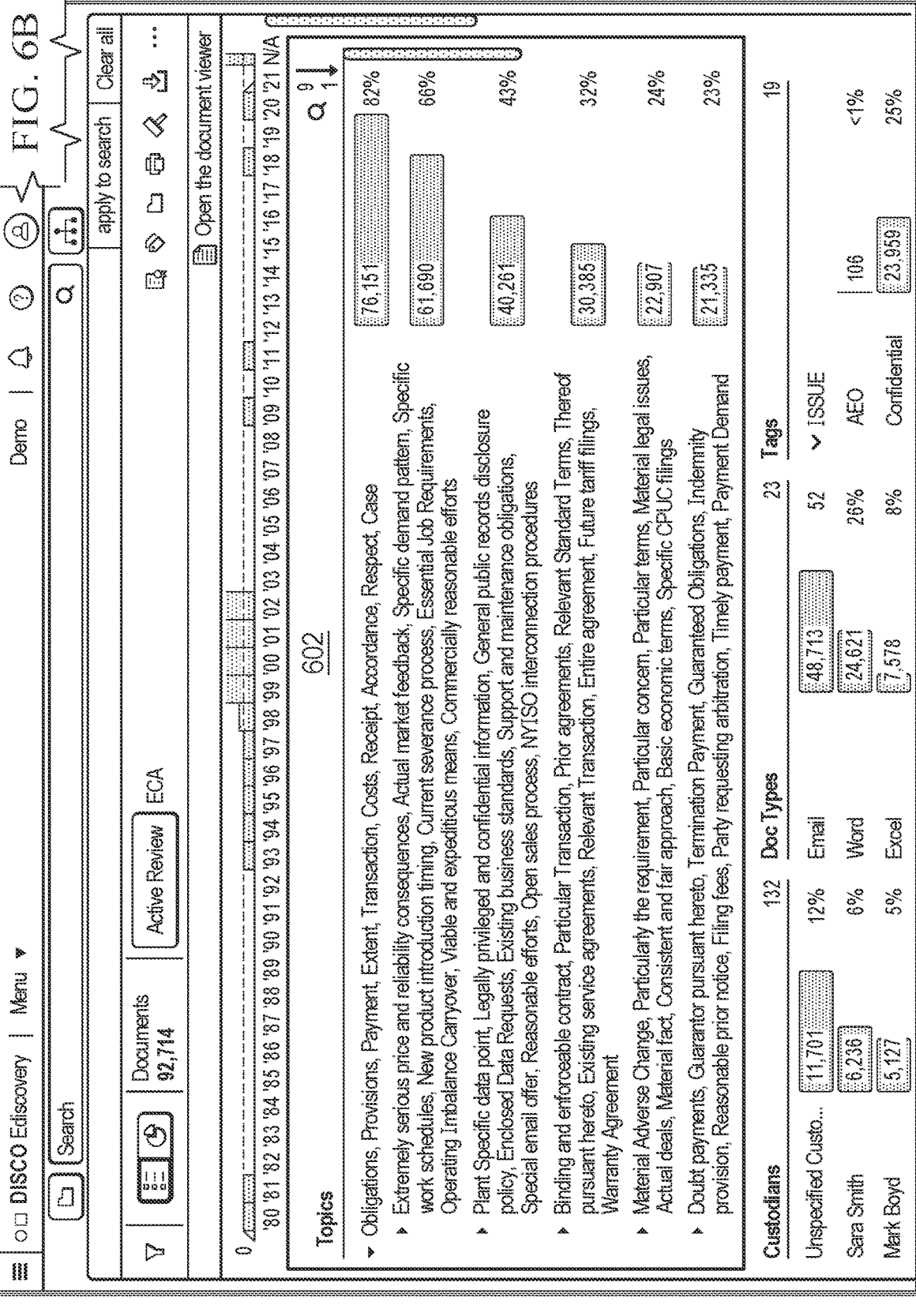
Figure 6C:
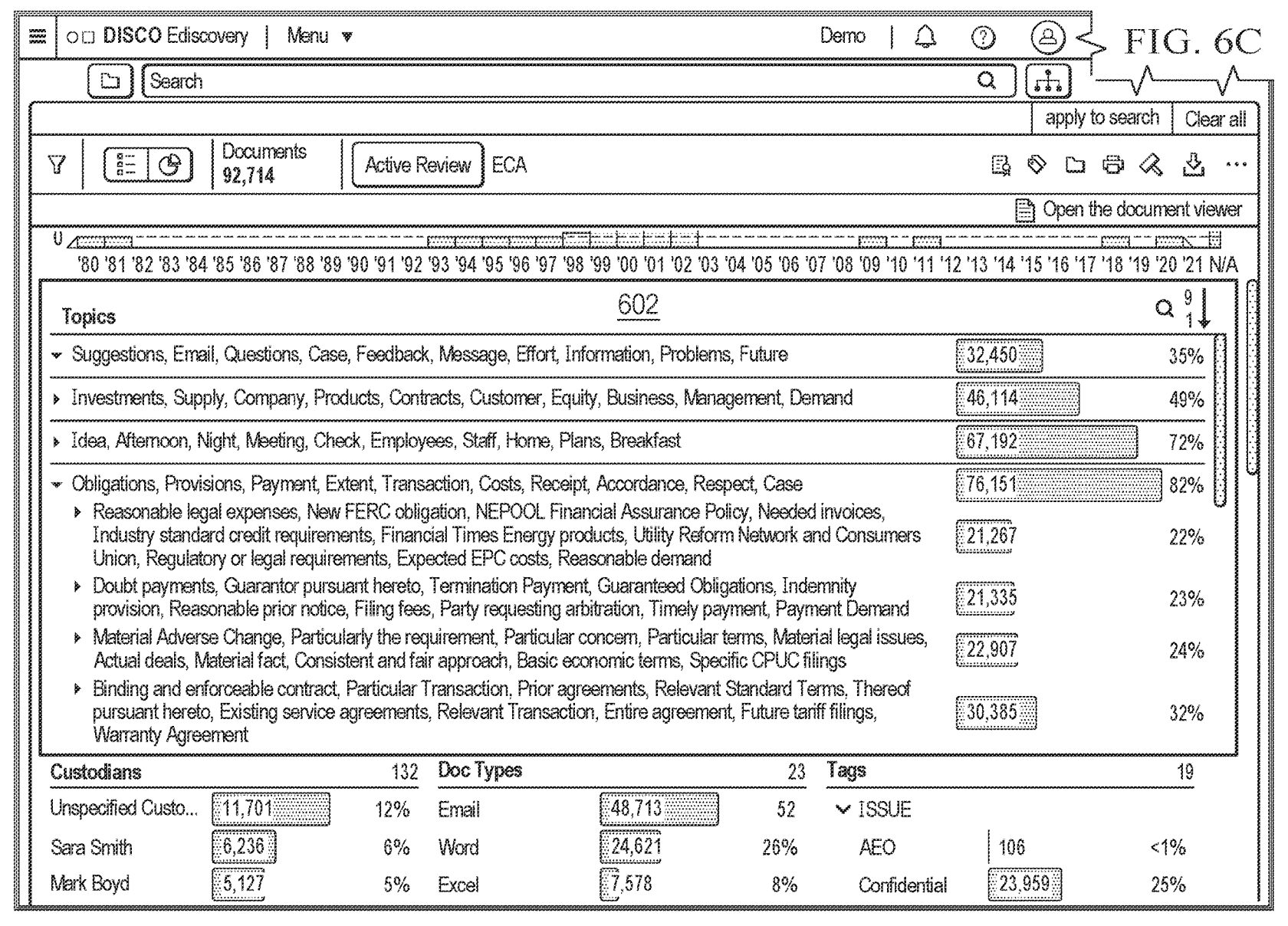

FIGS. 6A-6G depict embodiments of interfaces that include viewports adapted to present topic hierarchies and provision portions of those topic hierarchies in an on-demand manner based on user interaction with the viewport and the size of the viewport. FIG. 6A depicts an initial state of such an interface. Here, four nodes at the highest level in a topic hierarchy are presented through the viewport 602. As depicted in FIG. 6B, when the user expands a first node at the highest level of the topic hierarchy (e.g., "Obligations . . . "), the child nodes of the displayed nodes can be requested and processed by the interface. How many of the current results are in each visible node may be tracked by the interface and the child nodes rendered in the viewport 602. FIG. 6C depicts the interface once the sort is reversed.

Figure 6D:
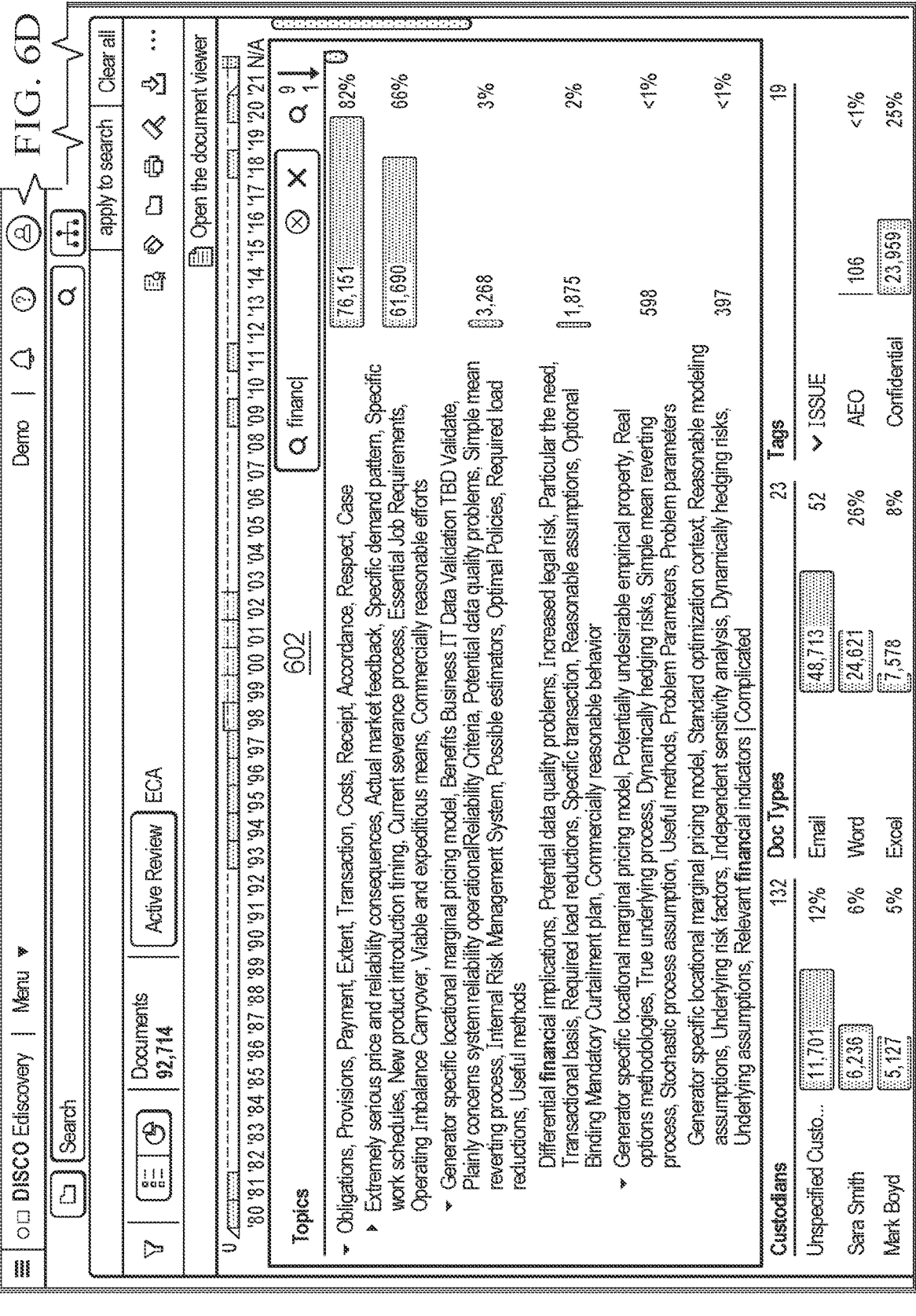
Figure 6E:
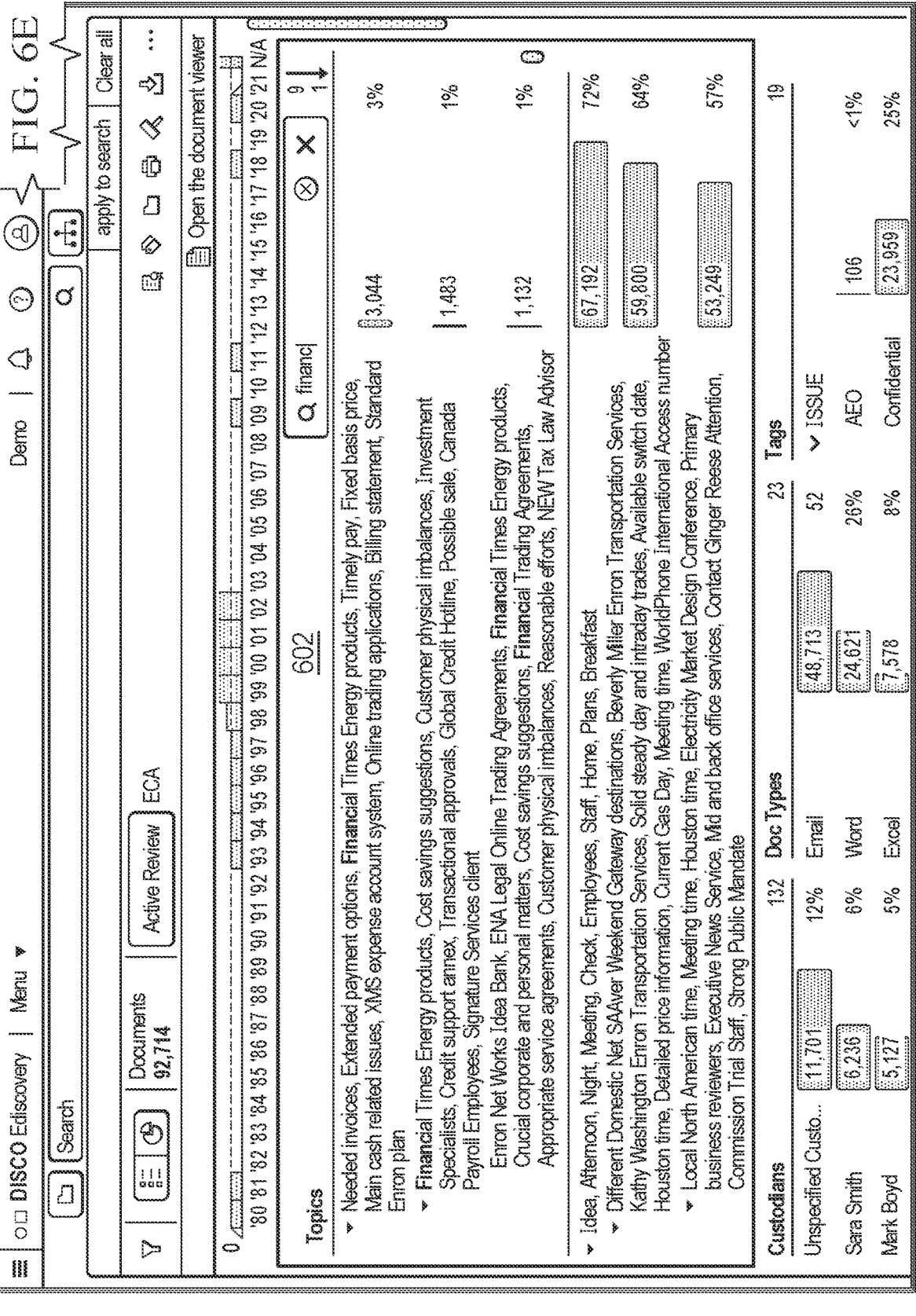
Figure 6F:
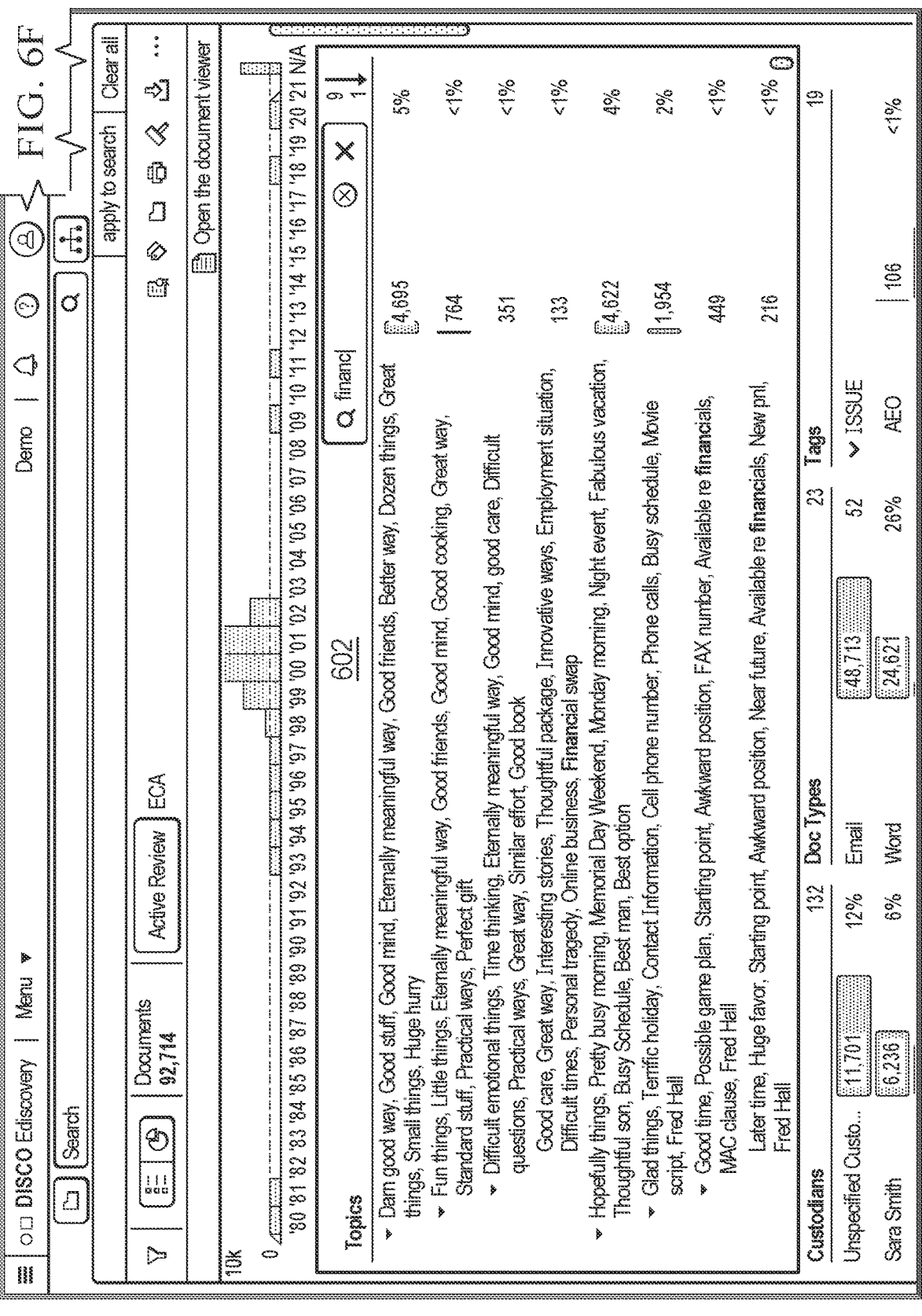

Now, with reference to FIG. 6D, suppose the user types in "financ" into the "Find" box of the interface, indicating that they want to see the nodes of the topic hierarchy matching that input and all their ancestors (e.g., for context). Starting from the highest level nodes of the topic hierarchy the entire topic hierarchy can be searched for topic nodes matching that input ("financ") and their parents (e.g., using a recursive query). Now we have a tree which may match the user input. That tree can be adjusted (pruning non-matching nodes and ordering those that remain). Such an adjustment may be made, for example, according to the intersection of documents in the result set and documents in each node.

With reference to FIGURED 6E and 6F, the interface is now in a state where there exist unexpanded nodes unseen, below the viewport 602. Before the user scrolls these nodes into view in the viewport 602, the interface will expand these nodes with a recursive interaction (e.g., request) to a search system as discussed. Specifically, the interface may track what in the subtree is being displayed in the viewport 602 and where the sliding window of the user's gaze is over the portion of the tree displayed in the viewport 602 and communicates with the searcher system to provide greater and greater fidelity to the nodes displayed in the viewport 602 as the user scrolls or otherwise interacts with the viewport 602.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such a computer-readable medium shall generally be machine readable and include software programming or code that can be human readable (e.g., source code) or machine readable (e.g., object code). Examples of non-transitory computer-readable media can include random access memories, read-only memories, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose CPU, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion.

For example, a process, product, article, or apparatus that comprises a list of elements is not necessarily limited to only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a set", "a" or "an" (and "the" when antecedent basis is "a" or "an") includes both singular and plural of such term, unless clearly indicated otherwise (i.e., that the reference "a set", "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A system for document analysis for efficient generation of a navigation interface, the system comprising:
   a processor;
   a data store storing a set of electronic documents and a tree-based organizational hierarchy associated with the set of electronic documents; and
   a non-transitory computer-readable medium comprising instructions for:
      rendering an interactive viewport in a portion of a user interface on a user device, the interactive viewport having a first size, wherein the first size of the interactive viewport is associated with a portion of the tree-based organizational hierarchy;
      receiving a request specifying a number of nodes and an interaction criterion;
      searching the tree-based organizational hierarchy to determine nodes of the tree-based organizational hierarchy based on the interaction criterion and parent nodes of the matching nodes;
      determining a subtree of the tree-based organizational hierarchy based on the determined nodes of the organizational hierarchy and the number of nodes specified in the request, wherein determining the subtree comprises ordering the determined nodes based on an ordering criterion and selectively expanding one or more of the ordered nodes in a depth-first manner to populate the subtree with a number of nodes corresponding to the number of nodes specified in the request; and
      returning the subtree for rendering in the viewport within the user interface on the user device, the viewport having a second size associated with the subtree.

2. The system of claim 1, wherein the tree-based organizational hierarchy comprises a topic hierarchy.

3. The system of claim 2, wherein the topic hierarchy is determined by clustering documents, portions of the documents, or a combination thereof within the set of electronic documents based on embeddings of the portions of the documents.

4. The system of claim 1, wherein determining the subtree comprises ordering the nodes associated with the interaction criterion at a highest level of the tree-based organizational hierarchy based on an ordering criterion.

5. The system of claim 4, wherein the non-transitory computer-readable medium comprises instructions for expanding the subtree by adding child nodes of the highest ordered node in the tree-based organizational hierarchy to the subtree.

6. The system of claim 4, wherein the ordering criterion is a number of documents associated with each of the nodes at the highest level of the tree-based organizational hierarchy.

7. The system of claim 6, wherein determining the number of documents comprises searching the set of electronic documents to determine the number of documents associated with each of the nodes at the highest level of the tree-based organizational hierarchy.

8. A method, comprising:
   rendering an interactive viewport in a portion of a user interface on a user device, the interactive viewport having a first size, wherein the first size of the interactive viewport is associated with a portion of a tree-based organizational hierarchy associated with a set of electronic documents;
   receiving a request specifying a number of nodes and an interaction criterion;
   searching the tree-based organizational hierarchy to determine nodes of the tree-based organizational hierarchy based on the interaction criterion and parent nodes of the matching nodes;
   determining a subtree of the tree-based organizational hierarchy based on the determined nodes of the organizational hierarchy and the number of nodes specified in the request, wherein determining the subtree comprises ordering the determined nodes based on an ordering criterion and selectively expanding one or more of the ordered nodes in a depth-first manner to populate the subtree with a number of nodes corresponding to the number of nodes specified in the request; and
   returning the subtree for rendering in the viewport within the user interface on the user device, the viewport having a second size associated with the subtree.

9. The method of claim 8, wherein the tree-based organizational hierarchy comprises a topic hierarchy.

10. The method of claim 9, wherein the topic hierarchy is determined by clustering documents, portions of the documents, or a combination thereof within the set of electronic documents based on embeddings of the portions of the documents.

11. The method of claim 8, wherein determining the subtree comprises ordering the nodes associated with the interaction criterion at a highest level of the tree-based organizational hierarchy based on an ordering criterion.

12. The method of claim 11, further comprising:
   expanding the subtree by adding child nodes of the highest ordered node in the tree-based organizational hierarchy to the subtree.

13. The method of claim 11, wherein the ordering criterion is a number of documents associated with each of the nodes at the highest level of the tree-based organizational hierarchy.

14. The method of claim 13, wherein determining the number of documents comprises searching the set of electronic documents to determine the number of documents associated with each of the nodes at the highest level of the tree-based organizational hierarchy.

15. A non-transitory computer-readable medium, comprising instructions for:

rendering an interactive viewport in a portion of a user interface on a user device, the interactive viewport having a first size, wherein the first size of the interactive viewport is associated with a portion of a tree-based organizational hierarchy associated with a set of electronic documents;

receiving a request specifying a number of nodes and an interaction criterion;

searching the tree-based organizational hierarchy to determine nodes of the tree-based organizational hierarchy based on the interaction criterion and parent nodes of the matching nodes;

determining a subtree of the tree-based organizational hierarchy based on the determined nodes of the organizational hierarchy and the number of nodes specified in the request, wherein determining the subtree comprises ordering the determined nodes based on an ordering criterion and selectively expanding one or more of the ordered nodes in a depth-first manner to populate the subtree with a number of nodes corresponding to the number of nodes specified in the request; and returning the subtree for rendering in the viewport within the user interface on the user device, the viewport having a second size associated with the subtree.

16. The non-transitory computer-readable medium of claim 15, wherein the tree-based organizational hierarchy comprises a topic hierarchy.

17. The non-transitory computer-readable medium of claim 16, wherein the topic hierarchy is determined by clustering documents, portions of the documents, or a combination thereof within the set of electronic documents based on embeddings of the portions of the documents.

18. The non-transitory computer-readable medium of claim 15, wherein determining the subtree comprises ordering the nodes associated with the interaction criterion at a highest level of the tree-based organizational hierarchy based on an ordering criterion.

19. The non-transitory computer-readable medium of claim 18, further comprising instructions for expanding the subtree by adding child nodes of the highest ordered node in the tree-based organizational hierarchy to the subtree.

20. The non-transitory computer-readable medium of claim 18, wherein the ordering criterion is a number of documents associated with each of the nodes at the highest level of the tree-based organizational hierarchy.

21. The non-transitory computer-readable medium of claim 20, wherein determining the number of documents comprises searching the set of electronic documents to determine the number of documents associated with each of the nodes at the highest level of the tree-based organizational hierarchy.

* * * * *